United States Patent
Al-Hakim et al.

(10) Patent No.: US 12,508,139 B2
(45) Date of Patent: Dec. 30, 2025

(54) AUXETIC STENTS FOR MANAGING VENOUS STENOSIS

(71) Applicant: Oregon Health & Science University, Portland, OR (US)

(72) Inventors: Ramsey Al-Hakim, Portland, OR (US); Khashayar Farsad, Portland, OR (US); John Kaufman, Portland, OR (US); Craig Bonsignore, Pleasanton, CA (US)

(73) Assignee: Oregon Health & Science University, Portland, OR (US)

( * ) Notice: Subject to any disclaimer, the term of this patent is extended or adjusted under 35 U.S.C. 154(b) by 0 days.

(21) Appl. No.: 18/523,755

(22) Filed: Nov. 29, 2023

(65) Prior Publication Data

US 2024/0099867 A1    Mar. 28, 2024

Related U.S. Application Data

(62) Division of application No. 17/277,850, filed as application No. PCT/US2020/013156 on Jan. 10, 2020.

(Continued)

(51) Int. Cl.
    *A61F 2/915* (2013.01)

(52) U.S. Cl.
    CPC .... *A61F 2/915* (2013.01); *A61F 2002/91575* (2013.01); *A61F 2210/0019* (2013.01); *A61F 2220/0016* (2013.01)

(58) Field of Classification Search
    CPC ............ A61F 2/915; A61F 2002/91575; A61F 2002/8483; A61F 2210/0019; A61F 2220/0016
    See application file for complete search history.

(56) References Cited

U.S. PATENT DOCUMENTS

| 5,733,303 A | 3/1998 | Israel et al. |
| 7,758,632 B2 | 7/2010 | Hojeibane et al. |

(Continued)

FOREIGN PATENT DOCUMENTS

| EP | 1328212 B1 | 1/2007 |
| EP | 2638883 A1 | 9/2013 |

(Continued)

OTHER PUBLICATIONS

Korean Intellectual Property Office, International Search Report and Written Opinion issued by the International Application Division in PCT/US2020/013156, mailed May 7, 2020, 19 pages.

*Primary Examiner* — Katherine M Shi
*Assistant Examiner* — Mohammed S Adam
(74) *Attorney, Agent, or Firm* — Schwabe, Williamson & Wyatt, P.C.

(57) ABSTRACT

Stents useable for treating venous stenosis are disclosed. In embodiments, a stent is configured to be auxetic, expanding axially as it is expanded radially, to prevent the imposition of tension on portions of a blood vessel adjacent to the stented portion of the blood vessel, and thereby prevent a narrowing of the adjacent portions and improving luminal gain. The stent may include one or more cross members that are deformable axially, to allow the axial length of the stent to be adjusted while maintaining a constant diameter, and further to allow the stent to be curved to conform to vessel curvature.

15 Claims, 33 Drawing Sheets

Related U.S. Application Data

(60) Provisional application No. 62/876,994, filed on Jul. 22, 2019, provisional application No. 62/791,091, filed on Jan. 11, 2019.

(56) References Cited

U.S. PATENT DOCUMENTS

| | | |
|---|---|---|
| 10,266,310 B2 | 4/2019 | Li et al. |
| 2001/0027339 A1 | 10/2001 | Boatman et al. |
| 2002/0045933 A1 | 4/2002 | Jang |
| 2002/0049487 A1 | 4/2002 | Lootz et al. |
| 2002/0123798 A1* | 9/2002 | Burgermeister .......... A61F 2/91 623/1.17 |
| 2004/0230291 A1 | 11/2004 | Richter |
| 2006/0129227 A1 | 6/2006 | Hengelmolen |
| 2008/0255660 A1 | 10/2008 | Guyenot |
| 2009/0149945 A1* | 6/2009 | Pike ........................ A61F 2/915 623/1.36 |
| 2011/0029063 A1 | 2/2011 | Ma et al. |
| 2014/0090231 A1 | 4/2014 | Trollsas et al. |
| 2017/0231790 A1 | 8/2017 | Abunassar et al. |
| 2017/0296343 A1 | 10/2017 | Khosravi et al. |

FOREIGN PATENT DOCUMENTS

| | | |
|---|---|---|
| JP | 2005506094 A | 3/2005 |
| JP | 2005534396 A | 11/2005 |
| JP | 2006520239 A | 9/2006 |
| JP | 2014500048 A | 1/2014 |
| WO | 0226163 A2 | 4/2002 |
| WO | 2004012785 A1 | 2/2004 |
| WO | 2004087015 A2 | 10/2004 |

* cited by examiner

Crimped position (t=1); 2.5 mm diameter;10-cell design (left) 12-cell design (right)

Deployed to 12mm diameter (t=2); 10-cell design (left) 12-cell design (right)

AUXETIC STENTS FOR MANAGING VENOUS STENOSIS

CROSS-REFERENCE TO RELATED APPLICATIONS

The present application is a divisional of U.S. patent application Ser. No. 17/277,850 filed Mar. 19, 2021, which is a national phase entry under 35 U.S.C. § 371 of International Application No. PCT/US2020/013156, filed Jan. 10, 2020, entitled "AUXETIC STENTS FOR MANAGING VENOUS STENOSIS," which designated, among the various States, the United States of America, and which claims priority to U.S. Provisional Application No. 62/791,091 filed Jan. 11, 2019, and U.S. Provisional Application No. 62/876,994 filed Jul. 22, 2019, all of which are hereby incorporated by reference in their entirety.

FIELD

The present disclosure relates to stents useable in medical settings, and in particular, auxetic stents useable for managing venous stenosis.

BACKGROUND

According to Center for Disease Control and Prevention statistics, the annual incidence of venous thromboembolism is estimated at 900,000 per year (1 to 2 per 1,000). Post-thrombotic syndrome (PTS) is a long-term complication associated with deep venous thrombosis (DVT) that can lead to long-term symptoms including pain, swelling, and heaviness. Given the relatively high prevalence and associated symptoms, previous studies have suggested a socioeconomic impact in the US of at least $200 million associated with chronic venous disease.

DETAILED DESCRIPTION

Figure 1A:
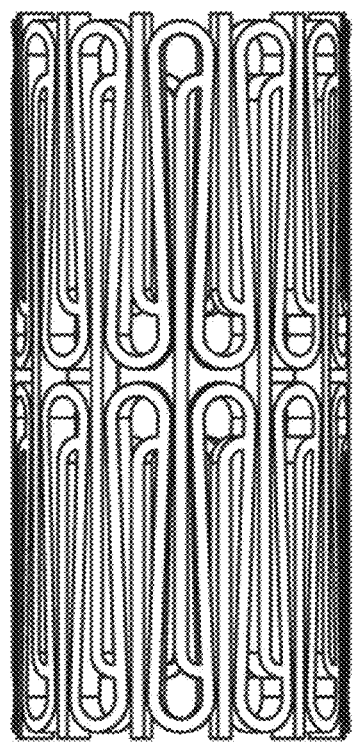
FIG. 1A is a side elevation view of an example auxetic stent for treatment of venous stenosis, in a reentrant orthogonal configuration, according to various embodiments.

In the following detailed description, reference is made to the accompanying drawings which form a part hereof, and in which are shown byway of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B, and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The two main contributing factors in the pathophysiology of post-thrombotic syndrome (PTS) are venous outflow obstruction due to narrowing related to chronic venous fibrosis and incompetency of the venous valves. In patients with venous outflow obstruction due to chronic fibrosis, treatment with venous stenting has been shown to improve flow with short-term clinical relief. However, approximately 25% of stents placed for thrombotic disease occlude in the 3- to 5-year period, and even more stents occlude in the chronic total occlusion recanalization patient group. Unfortunately, the stents used in these reports were initially designed for use in the arteries or outside the vascular system. While the pathophysiology of PTS is not completely understood, prior studies have suggested that one of the main contributing factors is venous outflow obstruction due to narrowing related to chronic venous fibrosis (venous stenosis).

Based on a retrospective analysis of venograms before and after iliac vein stent placement, a significant narrowing of the external iliac vein occurs after placement of an adjacent common iliac vein stent. Furthermore, the degree of narrowing is associated with the relative increase in common iliac vein diameter. These findings indicate that biomechanical forces are being transferred to the adjacent vein portions after stent placement, and the degree of transduced force is related to the radial force (imposed by the stent as it is expanded) in the treated segment. The anisotropic elasticity of veins has been previously described, quantified, and modeled, and may be a crucial characteristic to understand this observation.

Anisotropic elasticity refers to the non-uniform mechanical responses of a vein dependent on the direction in which stress is applied. Specifically, a prior ex vivo study has demonstrated that veins are less extensible in the longitudinal direction relative to the circumferential direction when compared to arteries. This is relevant to venous biomechanics because application of a radial force results in a longitudinal force due to the Poisson effect, which is an inherent property of materials including veins. Given the relatively high longitudinal stiffness of veins at high pressure, the resultant longitudinal force due to the Poisson effect would result in retraction, e.g. a shortening of length, on portions of the vein adjacent to the stent location during application of radial force associated with stent placement. This Poisson effect and resultant narrowing have been demonstrated in finite element analysis (FEA) models of veins. Furthermore, comparing FEA models of veins and arteries demonstrates the effect is much more pronounced in veins relative to arteries (both in magnitude of longitudinal strain and adjacent vessel narrowing) due to the increased Young's modulus (stiffness) of veins compared to arteries. These FEA findings are further supported by clinical data given the correlation of the degree of external iliac vein (EIV) narrowing with the relative common iliac vein (CIV) diameter increase. Furthermore, the Poisson effect is likely exacerbated in a post-thrombotic vein due to the relatively increased Young's modulus of a post-thrombotic, fibrotic vein compared to a normal healthy vein.

Consequently, application of direct radial force from a stent in a venous stenosis is not an ideal treatment, due to the redistribution of applied radial force in a longitudinal direction and the resulting incomplete expansion of the vein, namely, a narrowing of the vein adjacent to the stent placement. Utilizing endovascular devices that actively control the longitudinal aspect of a vein, in addition to radial expansion, may result in improved overall luminal gain and improved outcomes. Controlling the longitudinal biomechanical forces will not only prevent transferred force on the adjacent vein segments, but will improve direct application of treatment forces to the diseased vein segment and improve luminal gain in the diseased segments. Active longitudinal control with longitudinal tensile strain in the treated segments will not only reverse the compression seen with current treatment options, but also apply direct longitudinal strain on the diseased segment (in addition to radial expansion). Through these biomechanical methods, active control and redistribution of longitudinal forces will result in an overall increased venous luminal volume and improved venous flow.

One potential method to apply both radial expansion and longitudinal expansion is the use of stents with auxetic geometries. Auxetic stents are defined by geometry which exhibits a negative Poisson's ratio. Poisson's ratio is the signed ratio of transverse strain to longitudinal strain. By definition, a geometry with a negative Poisson's ratio will elongate during radial expansion. Auxetic stents using these geometries will result in relaxation, rather than tension, on the adjacent vein segments and improve the overall luminal volume gain in the stented and non-stented segments. While terms such as "auxetic" and "Poisson's ratio" are commonly used to describe properties of materials, in the present context, we use these terms to describe properties of the stent design geometry, and not necessarily the material or materials from which it is fabricated.

The following description relates to stents useable for treatment of venous stenosis, and methods of using the same. Specifically, the stents are auxetic in nature, expanding in length in a longitudinal (or axial) direction when they are expanded radially.

Figure 6:
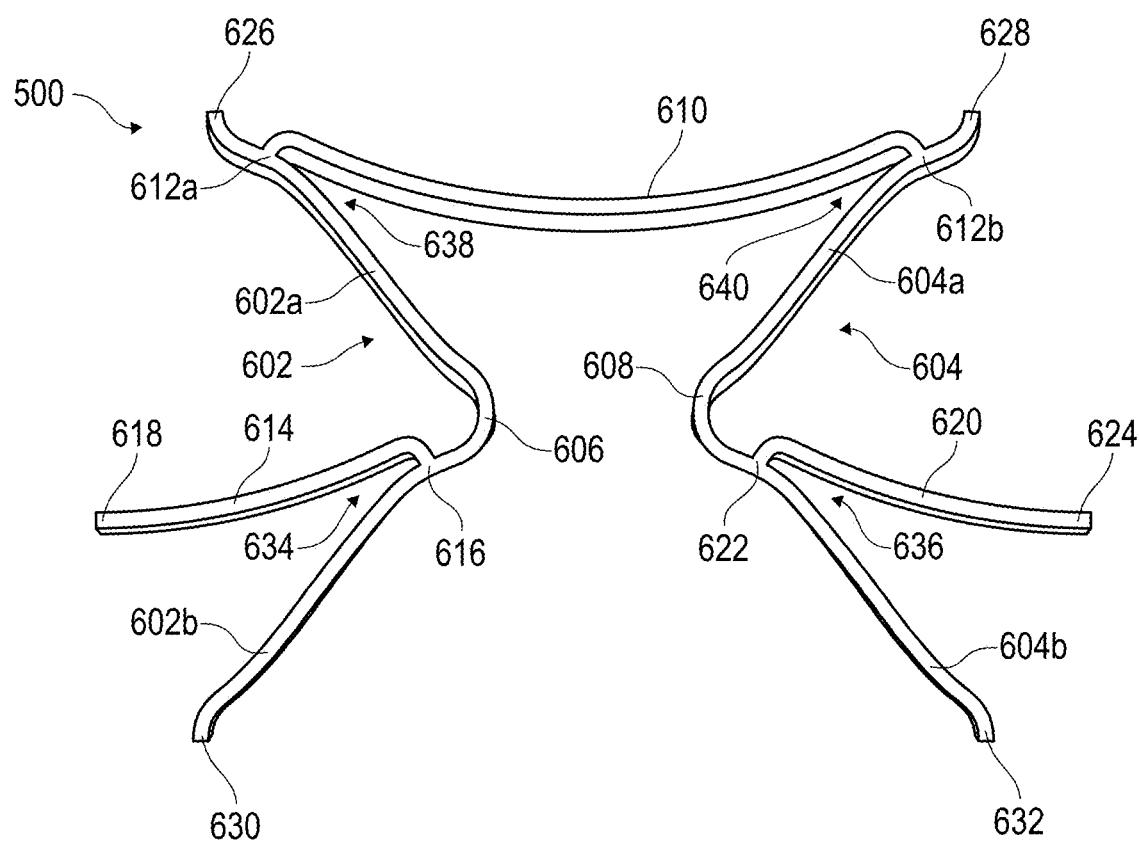
FIG. 6 depicts the example cell of FIG. 5, expanded to 14 mm, according to various embodiments.

FIGS. 1A-4 depict various views of an auxetic stent 100, which may be used to treat venous stenosis with improved luminal gain. As depicted in FIGS. 1A and 1B, stent 100 is in a compressed form, at its most compact, and is tubular in configuration, with a hollow center 110. In FIG. 1C, a section of stent 100 is depicted to show the arrangement of the various cells 102 that comprise the stent 100. Each cell, as may be seen and as will be discussed herein with respect to FIG. 6, is comprised of a series of interconnected struts 101. The struts fold in on each other to allow stent 100 to be compressed or expanded. The specific configuration of the struts also give stent 100 its auxetic properties, as will be discussed further herein.

Figure 1B:
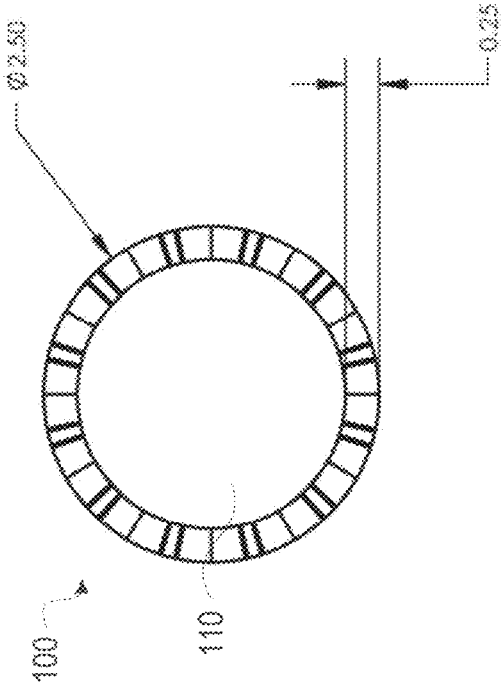
FIG. 1B is an axial view of the example auxetic stent of FIG. 1A, according to various embodiments.
Figure 1C:
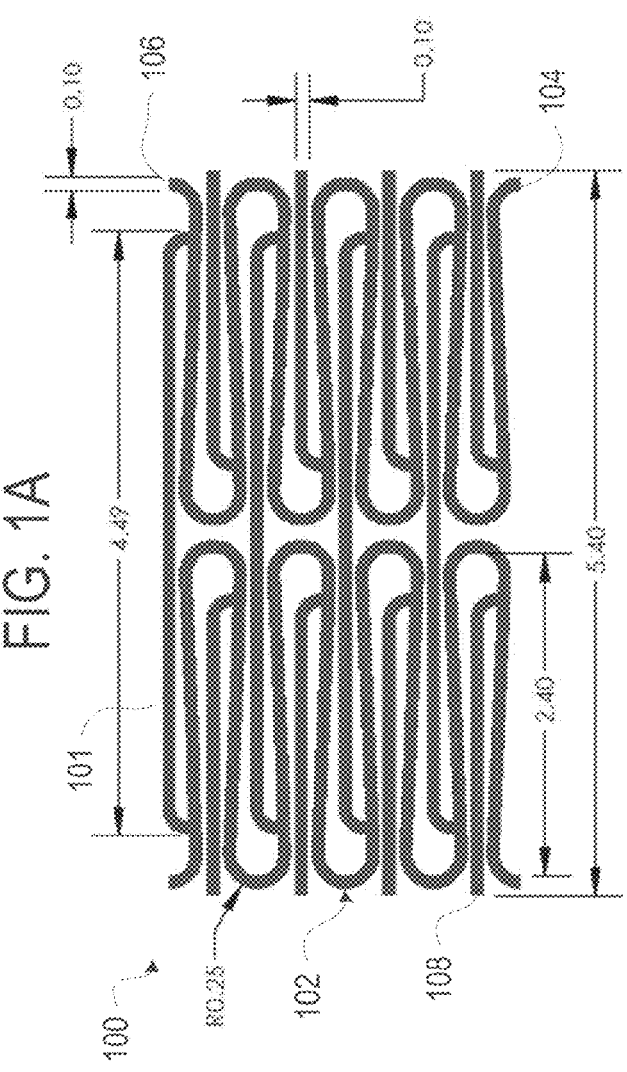
FIG. 1C is a diagram of the arrangement of cells comprising the example auxetic stent of FIGS. 1A and 1B, according to various embodiments.

FIG. 1C depicts four cells interconnected width-wise; it will be understood by a person skilled in the art that these cells may be wrapped around, with ends 104 joined to ends 106, to form the tubular configuration depicted in FIGS. 1A and 1B. Further, in addition to being joined widthwise, cells 102 may be joined lengthwise via ends 108, to extend the length of stent 100, rather than increasing diameter. Joining cells 102 with both ends 104, 106, and 108 allows a stent 100 to be constructed of any arbitrary diameter and length, as may be required for a given application. As may be recognized from FIGS. 1B and 1C, joining of the various cells effectively gives stent 100 a mesh configuration, by virtue of its interconnected cells.

The number and/or size of cells 102 determines the overall compressed size and dimensional properties of stent 100. For a given size of cell 102, a greater number of cells 102 will result in a larger diameter stent 100, while a fewer number will result in a smaller diameter stent 100. Similarly, for a given number of cells 102, larger or smaller cells 102 will result in correspondingly larger or smaller diameter stents 100. The arrangement of the various folded struts 101 contributes to the auxetic properties of stent 100, namely, the degree to which stent 100 lengthens axially as it is expanded radially. The number of cells 102 as well as the arrangement of struts 101 further contributes to the maximum amount of expansion or compression that stent 100 can provide.

Figure 2:
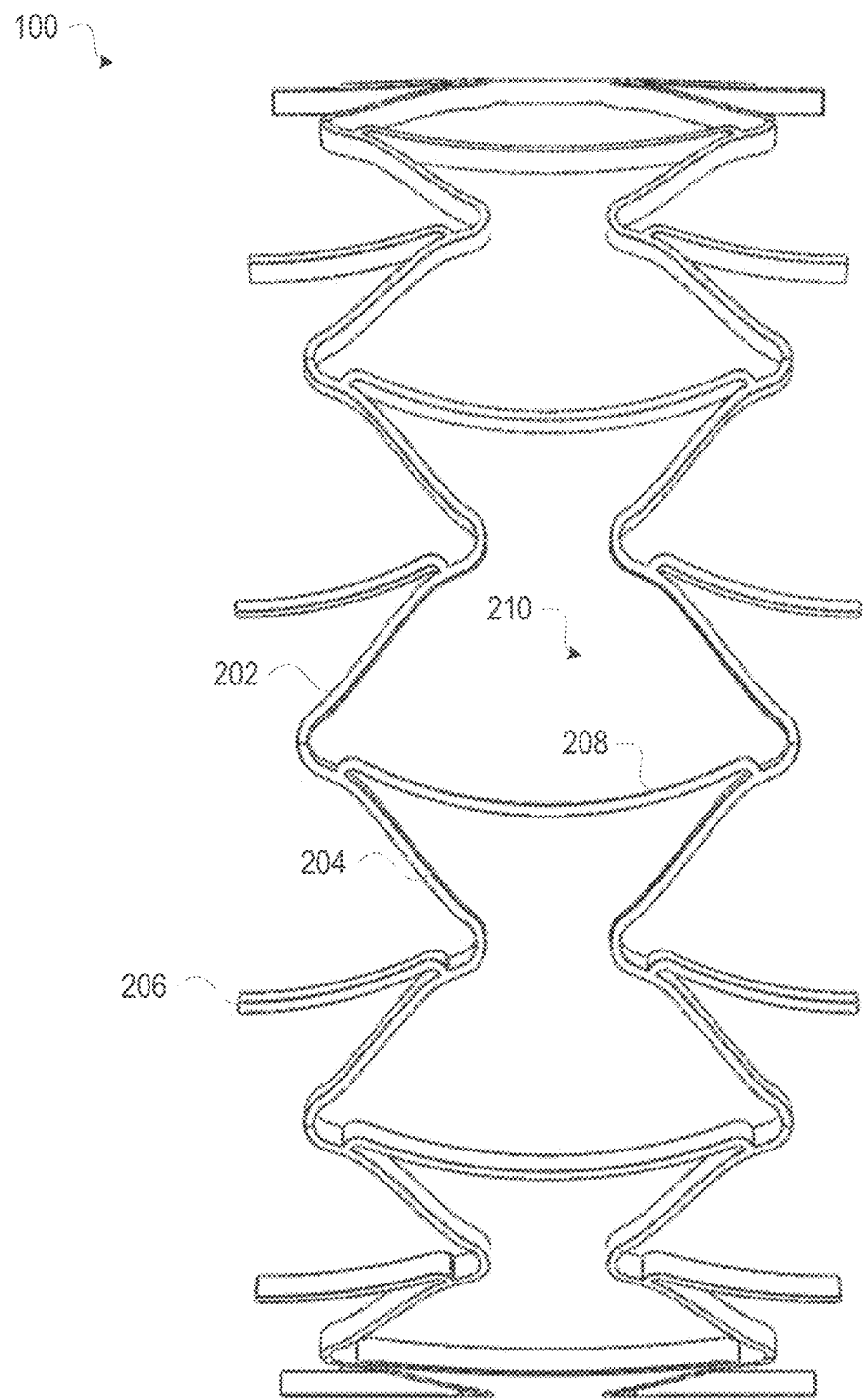
FIG. 2 is a side elevation view of an example auxetic stent radially expanded to 14 mm, according to various embodiments.

FIG. 2 depicts example stent 100 after expansion. In the depicted embodiment, using the dimensions of the various components of the example stent 100 illustrated in FIGS. 1B and 1C, e.g. 2.5 mm diameter, stent 100 is expanded to a diameter of 14 mm. As can be seen, the various struts unfold during expansion. As they unfold, some struts 202, 204, reorient from a horizontal position (relative to the other struts and with reference to the figure orientation) to a more vertical position. Struts 202 and 204 are interconnected by horizontal strut 208, which stays relatively stationary with respect to a given cell. This, in turn, creates an expanding space 210, where the interconnected cells of stent 100 form a lattice. Further, as struts 202 and 204 unfold to a vertical position, they force horizontal struts 206, on either side of each cell, outward away from space 210. This effectively causes the width of each cell, along the direction of horizontal struts 206 and 208, to expand. As can be seen by comparing with the compressed configuration of stent 100 depicted in FIG. 1A, the forcing out of strut 206 results in the overall axial length of stent 100 increasing as stent 100 is expanded radially, in keeping with its auxetic nature.

Figure 3:
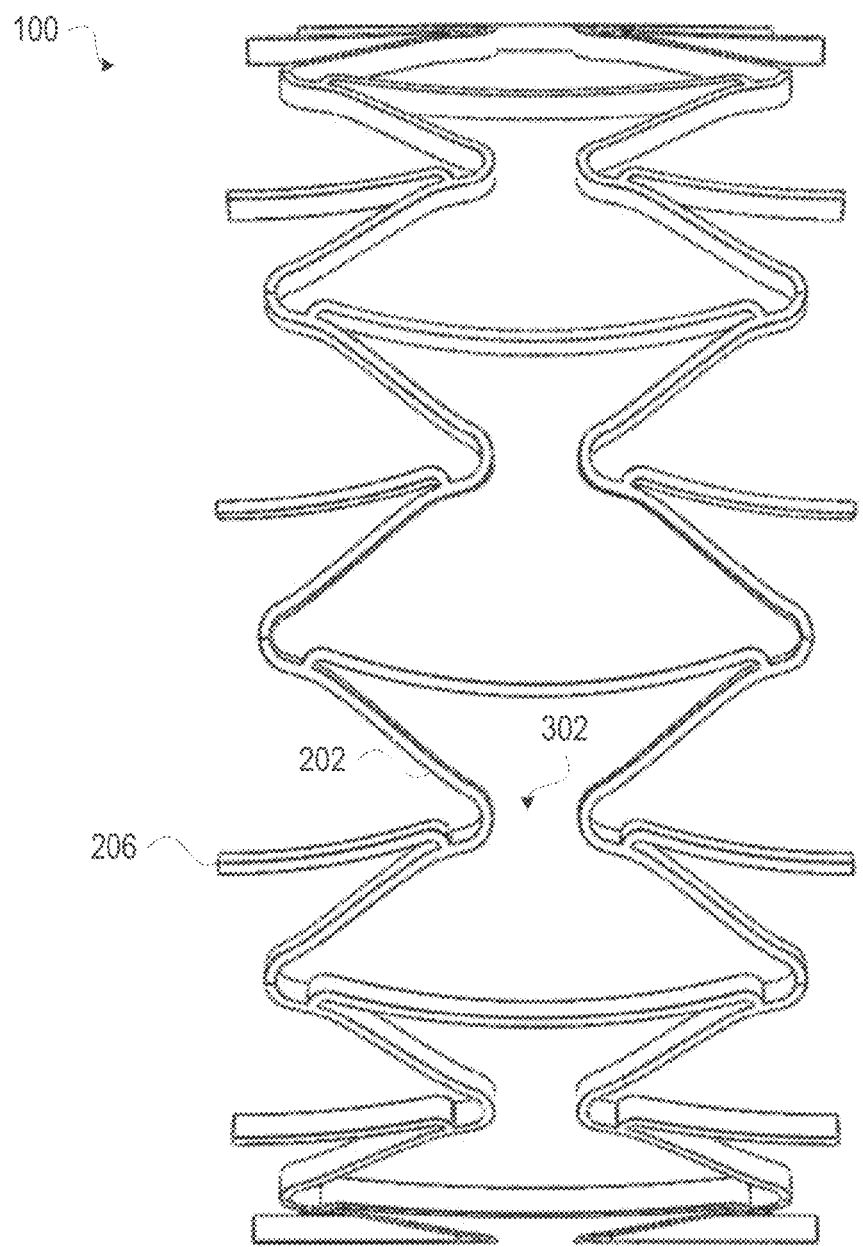
FIG. 3. is a side elevation view of the example auxetic stent of FIG. 2, radially relaxed to 12 mm, according to various embodiments.

FIG. 3 depicts stent 100 in a slightly relaxed configuration, where the diameter is reduced from 14 mm to 12 mm. The primary point of relaxation is the space 302 between struts 202, which has decreased in width compared to the embodiment depicted in FIG. 2. As a consequence, horizontal strut 206 has moved towards space 302, resulting in a contraction of the width of stent 100 in an axial direction. As will be discussed further herein, horizontal strut 208 may be deformable, thus allowing the axial length of stent 100 in a fully extended configuration to be reduced, such as by axial compression. When so compressed, stent 100 in a 14 mm expansion may have substantially the same axial length as the slightly relaxed, 12 mm configuration of stent 100.

Figure 4:
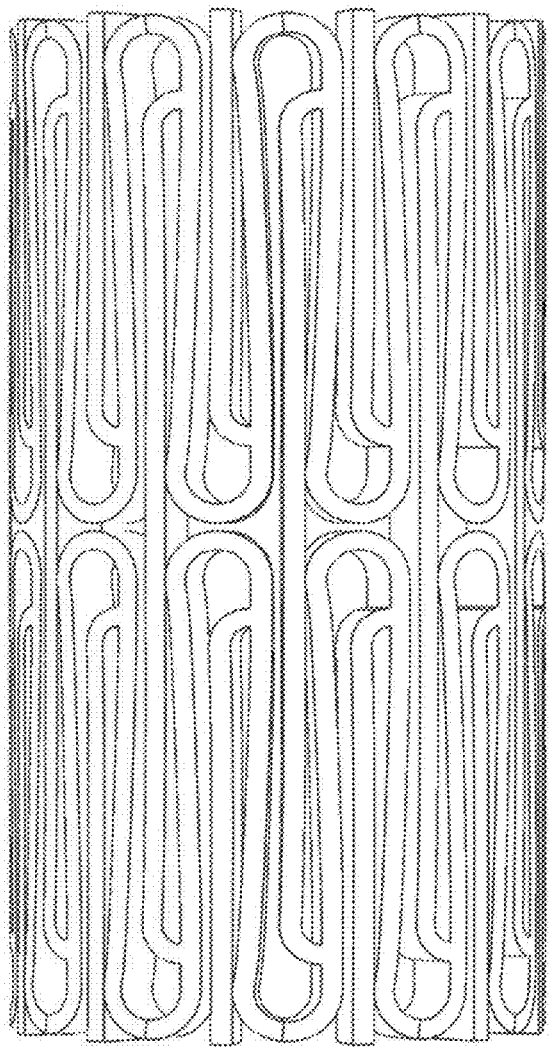
FIG. 4 is a side elevation view of the example auxetic stent of FIG. 2, radially compressed to 2.5 mm, according to various embodiments.

FIG. 4 depicts stent 100 in a fully compressed configuration, with a diameter of approximately 2.5 mm. Similar to FIGS. 1A and 1B, all struts in stent 100 are back to a folded configuration, with the corresponding axial length of stent 100 at a minimum.

Stent 100 may be manufactured from any material suitable for use in its intended application(s). In implementations intended for medical use, such as implantation or placement within a blood vessel such as vein, stent 100 may be manufactured from a suitable biologically inert material or materials, for example, a metallic alloy such as stainless steel or nitinol, or a polymer. Materials may be selected for their elastic or plastic qualities, with the response to expansion and relaxation as considerations. Some materials, such as types of metal, may be subject to various treatments to alter their elastic point, to emphasize plastic or elastic qualities. For example, in medical applications, a more plastic, deformable material may be desired over a material that is elastic, as stent 100 may need to retain its size following expansion to ensure the vein remains unobstructed. Such materials may exhibit little to no reduction in size following expansion. Other materials may retain a modest amount of elasticity following plastic deformation, to allow stent adjustment following initial placement. Expansion of stent 100 within a patient may be accomplished using well-known medical techniques, such as via an inflating endoscopic or catheter balloon.

In one embodiment, stent 100 may be formed from nitinol, an intermetallic compound having approximately 50.8 atomic percent Nickel and the balance Titanium. Nitinol has the unique properties of shape memory and superelasticity. In this embodiment, stent 100 takes advantage of the material's ability to withstand unusually high levels of strain (up to 8% or more), without experiencing plastic deformation. The material can have an unusually pronounced hysteresis effect (compared to other possible useable materials) in its stress-strain relationship. When subjected to loading, stresses are relatively high. As load continues to increase, the stress response eventually reaches an upper plateau (UP) where a phase change from austenite to martensite occurs. When the material is unloaded, stresses become relatively low, and reach a lower plateau (LP) where the material transforms from martensite to austenite. The magnitude of the difference between UP and LP stresses is determined by material composition, as well as thermal and processing history.

In some embodiments, the transition temperature for the material, known as the Austenite Finish (Af) temperature, is set between 10 degrees and 37 degrees C. When so processed into a shape, the material can plastically deform at temperatures below 37 degrees C., but return to the processed shape once the temperature reaches the Af temperature. Using such a principle, in another embodiment, stent 100 may be manufactured at a large diameter (FIG. 2), and compressed to a small diameter (FIG. 4), while simultaneously decreasing in axial length, for loading into a delivery catheter. Where stent 100 is manufactured from Nitinol, this radial compression is resisted by the UP stress. When such a stent is released from the delivery catheter and/or heated by the body heat of a patient, it may radially recover to an intermediate diameter (e.g., depicted in FIG. 3) controlled by the vein into which it is placed, while simultaneously increasing in length. This recovery is controlled by the LP stress. Therefore, thermal processing may be preferentially selected to achieve a desired Af temperature and LP stress suitable for application of desired radial and axial forces to the vein.

It should be understood that selection of materials for manufacturing stent 100 and/or treatment processes on the materials or stent 100 can be made to achieve desired performance characteristics of stent 100. For example, a given embodiment of stent 100 may be manufactured and treated to change shape primarily in a plastic mode, where changes to stent 100 shape are maintained without expansion or contraction, and so deliver a minimum of ongoing force to a surrounding vessel. Such an embodiment may be expanded (such as via catheter balloon during insertion) so that the surrounding vessel wall is in tension and imposes a force against the stent 100, which stent 100 resists but is not significantly compressed, and does not impose additional forces or stresses against the vessel. With such an embodiment, the amount of tension placed upon the vessel wall can be fine tuned (e.g. minimized or possibly eliminated) and adjusted during insertion of stent 100 by controlling the amount that stent 100 is expanded. Further, where stent 100 can be expanded to different degrees in different locations, such a stent 100 may allow tension on the vessel wall to vary across the length and diameter of stent 100.

In another embodiment, stent 100 may be manufactured/treated with elastic characteristics to provide a predetermined amount of force in opposition to compression, resulting in the vessel wall being placed under tension and expanding until the vessel wall tension balances the force imposed by stent 100. Further treatments may allow a stent 100 to exhibit varying degrees of plasticity/elasticity across its length, e.g. one end or section of stent 100 may provide an outward force by elasticity, while the other end or another section of stent 100 may provide a second, different outward force and/or may provide only plastic deformation, with no or an insubstantial amount of outward force. Such configurations may be manufactured, for example, by individually treating or manufacturing each cell to achieve a desired performance characteristic(s), and then assembling stent 100 from a variety of cells treated in various ways to achieve a stent 100 with variable or selective elastic/plastic characteristics across its length and diameter.

Figure 5:
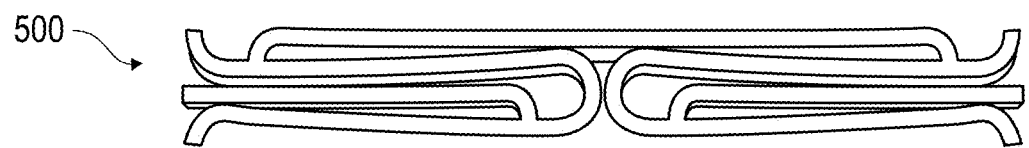
FIG. 5 depicts an example cell that may comprise an auxetic stent, in a compressed configuration to 2.5 mm, according to various embodiments.

Turning to FIGS. 5 and 6, an example cell 500 that may be used with embodiments of stents disclosed herein is depicted. FIG. 5 depicts the cell in its closed, unexpanded configuration. Cell 500 is similar in configuration and structure to each of the cells 102 depicted in FIGS. 1A-1C. FIG. 6 depicts the various components of cell 500. Cell 500 includes a first strut 602 and a second strut 604. Each of first strut 602 and second strut 604 comprise first and second segments 602a and 602b, and first and second segments 604a and 604b, respectively.

First and second segments 602a and 602b are delineated by a flexible junction 606, and first and second segments 604a and 604b are delineated by a flexible function 608. In embodiments, flexible junctions 606 and 608 may simply be bends formed in each of first strut 602 and second strut 604. In other embodiments, flexible junctions 606 and 608 may be formed separately to join the respective first and second segments 602a, 602b, 604a, 604b together, and may be made from the same or a different material than each of the various segments. In still other embodiments, flexible junctions 606 and 608 may be manufactured from a material selected for plasticity over elasticity, while the various struts and segments may be manufactured with relatively rigid materials not subject to, or subject to little, plastic deformation. Alternatively or additionally, the materials may be subject to processing that alters their elastic point to emphasize either plasticity or elasticity, depending on the needs of a given implementation. For example, in some embodiments all segments 602a, 602b, 604a, and 604b, along with flexible junctions 606 and 608, may be manufactured from a single material, with the material treated or processed for each segment and/or junction to achieve the desired properties, e.g. junctions 606 and 608 are treated to emphasize plasticity, while struts 602 and 604 are treated to emphasize elasticity.

First and second struts 602 and 604 are tied together by a cross member 610, which, in the depicted embodiment, is joined to first segment 602a at a junction 612a, and is joined to first segment 604a at a junction 612b. Junctions 612a and 612b may be similar in nature to flexible junctions 606 and 608, or may be more rigid. As a person skilled in the relevant art will appreciate, in the depicted embodiment junctions 612a and 612b will not typically be subject to the same amount of flexure as flexible junctions 606 and 608, and so may be implemented in a more rigid fashion. Junctions 612a and 612b, as can be seen in FIG. 6, are attached proximate to first segment ends 626 and 628, respectively, and distal from flexible junctions 616 and 622.

In embodiments, joining members 614 and 620 are attached to second segments 602b and 604b at junctions 616 and 622, respectively. Junctions 616 and 622 may be of a similar type as junctions 612a and 612b, insofar as they may not experience the same degree of flexure as flexible junctions 606 and 608. As can be seen in the depicted embodiment, junctions 616 and 622 are located relatively proximate to flexible junctions 606 and 608, respectively, and relatively distal from second segment ends 630 and 632. In other words, as can be seen in FIG. 6, junctions 616 and 622 are not placed equidistant between flexible junctions 606, 608 and second segment ends 630, 632, but rather are closer, and hence more proximate, to flexible junctions 606 and 608 and further from second segment ends 630, 632. The arrangement of the various junctions 612a, 612b, 616, and 622, and thus the placement of cross member 610 and joining members 614 and 620 with respect to struts 602 and 604 determines the overall geometry of cell 500, and likewise determines the amount of axial expansion expressed by a cell 500 upon expansion. As will be understood in the depicted embodiment, moving the various junctions 612a, 612b, 616, and 622 closer to the respective centers of first segments 602a and 602b, and second segments 604a and 604b, will result in a lesser degree of axial expansion; likewise, moving the various junctions further away from the respective centers will result in a greater degree of axial expansion.

As seen in example depicted in FIG. 6, in some embodiments joining members 614 and 620 attach at junctions 616, 622, respectively, to form an acute angle 634 and 636. Likewise, cross member 610 attaches at junctions 612a and 612b to form acute angles 638 and 640. As can be seen, angles 634, 636, 638, and 640 are acute in the sense that they are less than 90 degrees. In some embodiments, angles 634, 636, 638, and/or 640 are each formed from a substantially curved bend, which meets to the respective first and second members 602 and 604 (at junctions 612a, 612b, 616, and/or 622) in a substantially perpendicular orientation, and then curves to create an initially parallel section between respective joining members 614, 620, cross member 610, and first and second members 602 and 604. The joining members 614, 620, and/or cross member 610 may then diverge away from the first and second members 602 and 604 distal from the angles 634, 636, 638, and/or 640. The formation of angles 634, 636, 638, and/or 640 into acute angles can provide several benefits to the stent design of the cross member at the insertion site: facilitating successful loading/crimping of stent into a deliverable catheter after production (e.g. laser nitinol cutting) and expansion; facilitating axial/longitudinal stent compression and elongation (seen in FIGS. 7 and 8); facilitating radial expansion from loaded/crimped state; and, facilitating the foregoing benefits while minimizing stress/strain at the insertion site of the cross members, which may reduce long-term risk of stent fracture.

Each cell 500, as illustrated in the various figures, may be combined with adjacent cells 500 to form a stent 100. Each cell 500 joins with other cells via first segment ends 626 and 628, second segment ends 630 and 632, and joining member ends 618 and 624. Referring to FIGS. 1A, 1C, and 4 for the general arrangement of cells in a stent 100, it may be recognized that each first segment end 626 and 628 attaches to a corresponding second segment end 630 and 632, respectively, of an adjacent cell 500. The attachment of each first segment end 626 and 628 to adjacent second segment ends 630 and 632 effectively creates a second pair of flexible junctions. As these second flexible junctions serve the same function as flexible junctions 616 and 622 across a stent 100, these second flexible junctions may be configured identically to flexible junctions 616 and 622. It will be understood that flexible junctions 616 and 622 along with the second flexible junctions play a primary role in defining the expansion and crimping behavior of a stent 100, in embodiments.

Cells may be joined along an axial direction via the joining member ends 618 and 624, with a joining member end 618 attaching to a corresponding joining member end 624 of an adjacent cell 500. In the depicted embodiments, this connection effectively forms a second cross member, similar to cross member 610 in configuration, via the combination of a joining member 614 and a joining member 620 of an adjacent cell 500. Thus, this second cross member may be of a similar construction as cross member 610, and the connection between joining member ends 618 and 624 may be configured or of a type to result in a second cross member that is substantially identical to cross member 610 in terms of performance and material characteristics. For example, the joining member ends 618 and 624 may be welded or soldered together.

As will be understood, joining cells 500 both axially and circumferentially (for a tubular stent) can be repeated to provide a stent 100 of any diameter and axial length suited for a given intended use. Moreover, while stent 100 is described as being comprised of a plurality of discrete cells 500 that are joined together, this is only one possible method of manufacture, and is described to help illustrate the general structure of stent 100 rather than suggest a preferred method of manufacture. It should be understood that a stent 100 or a portion thereof may be manufactured as a singular unit, such as by spinning together one or more strands of suitable material such as wire, or via other pieces, larger or smaller, using any suitable manufacturing method, such as welding, soldering, tying, twisting, casting, or another method known or later developed.

To allow for further control of axial expansion of a stent 100 beyond the natural expansion resulting from the configuration of each cell 500, cross member 610 and second cross member formed from joining members 614 and 620 (collectively referred to herein as "cross member" or "cross members") may be configured to plastically deform via bending when either axial compression or tension is applied to a stent 100 that has been at least partially expanded. This deformation allows adjustments to be made to the axial length of a stent 100 while maintaining a constant expanded diameter, viz. without requiring the stent 100 to be radially expanded or crimped. Examples of this manipulation are depicted in FIGS. 7 and 8.

Figure 7:
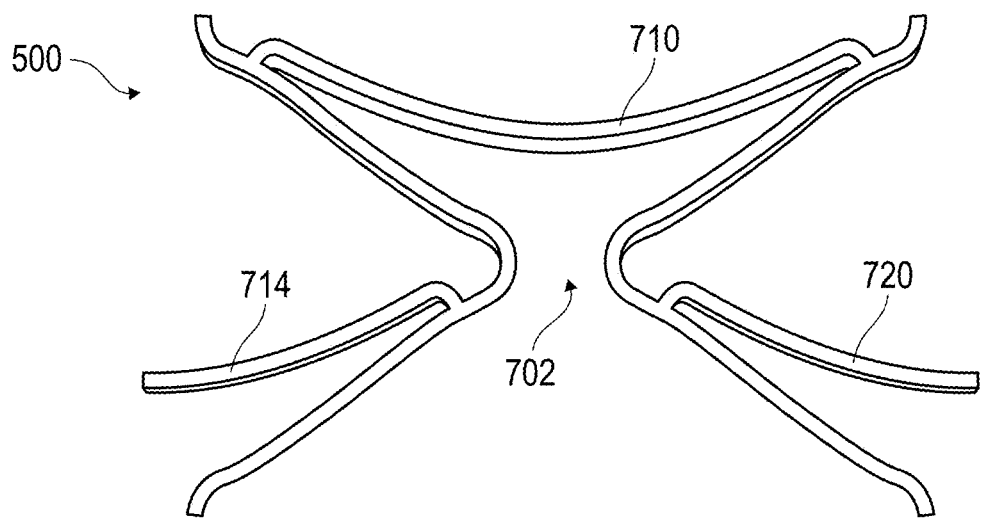
FIG. 7 depicts the example cell of FIG. 6, released to 12 mm and axially compressed, according to various embodiments.

In FIG. 7, a cell 500 from a stent 100 that has been radially expanded while holding its axial length constant is depicted. The same configuration may also result from axially compressing the stent 100 while holding its radial diameter constant. In the depicted embodiment, cross member 710 and corresponding joining members 714 and 720 are given a curve, thus resulting in a relative shortening of the axial length of stent 100. These curves may be imposed by axially compressing stent 100 while holding its radial diameter constant.

Figure 8:
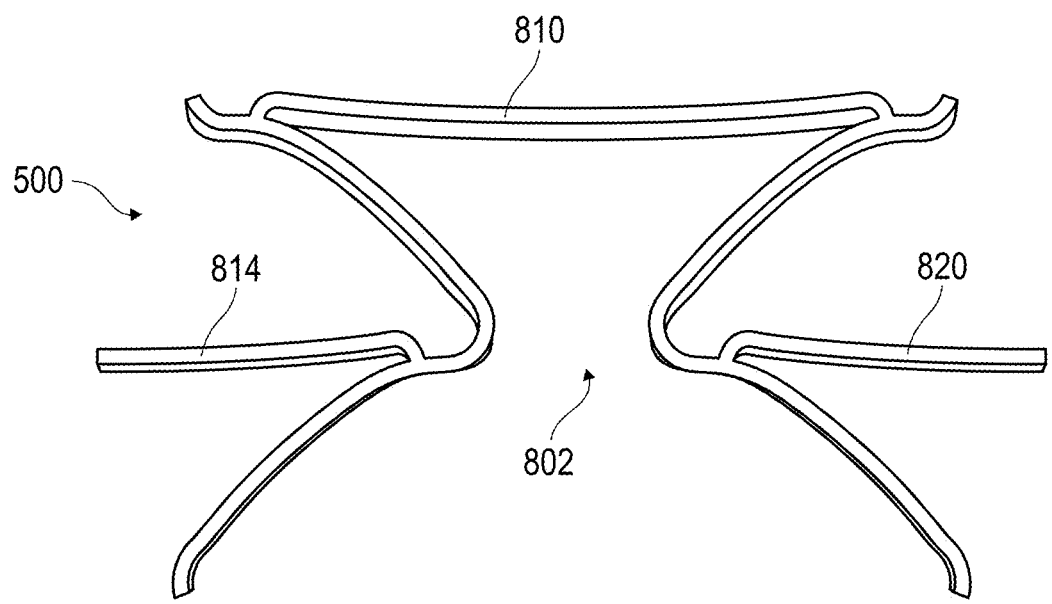
FIG. 8 depicts the example cell of FIG. 7, axially stretched, according to various embodiments.

In the embodiment depicted in FIG. 8, cross member 810 and corresponding joining members 814 and 820 are substantially straight and uncurved, thus maximizing the axial length of stent 100. Such straightening may be imposed by axially expanding or stretching stent 100 to the limits of the cross members, while holding its radial diameter constant, provided there is sufficient curvature in the joining members 814 and 820, and/or cross member 810. As will be observed, the straightening of the cross members results in the distance 802 measured between the flexible junctions to be wider than the corresponding distance 702 in the embodiment of FIG. 7, where the stent 100 has been axially compressed. Depending upon the configuration and construction of the cells 500 comprising a given stent 100, the radial diameter may either remain constant without mechanical assistance during application of axial pressure to stretch or compress, or may require a mechanical support, such as a balloon or other expander, to maintain the radial diameter.

Figure 9:
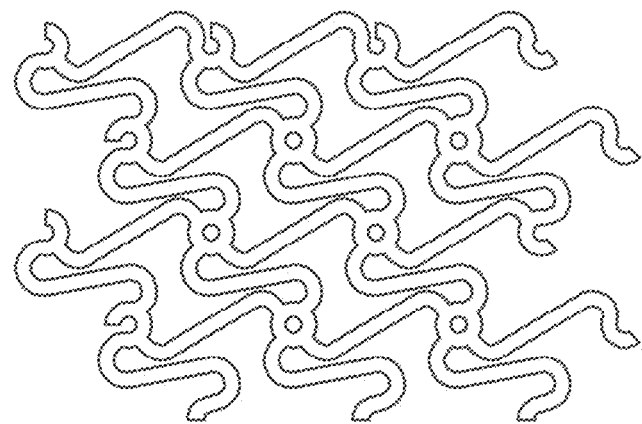
FIG. 9 depicts another example auxetic stent comprised of cells with a rotachiral rhomboid configuration, according to other embodiments.
Figure 10:
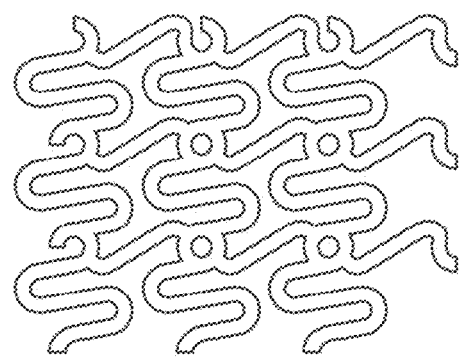
FIG. 10 depicts another example auxetic stent comprised of cells with a rotachiral orthogonal configuration, according to other embodiments.

While FIGS. 1A-8 depict cells with a reentrant orthogonal configuration, FIGS. 9 and 10 depict alternative embodiments of cells to comprise stents. FIG. 9 depicts a plurality of cells, each of a rotachiral rhomboid configuration. FIG. 10 depicts a plurality of cells, each of a rotachiral orthogonal configuration. As may be observed from the figures, the rhomboid configuration results in ring structures arrayed in a staggered configuration, while the orthogonal configuration results in ring structures arrayed in a grid configuration. The various configurations may offer performance differences that lend themselves to differing applications, e.g. some configurations may be more suitable to blood vessels that are substantially curved, while other configurations may be more suitable to blood vessels that are substantially straight. In either configuration, axial length may still be adjustable while holding the radial diameter constant; however, the mechanism to adjust the axial length may involve application of a rotary or circumferential force, rather than an axial compression or stretching.

Figure 11:
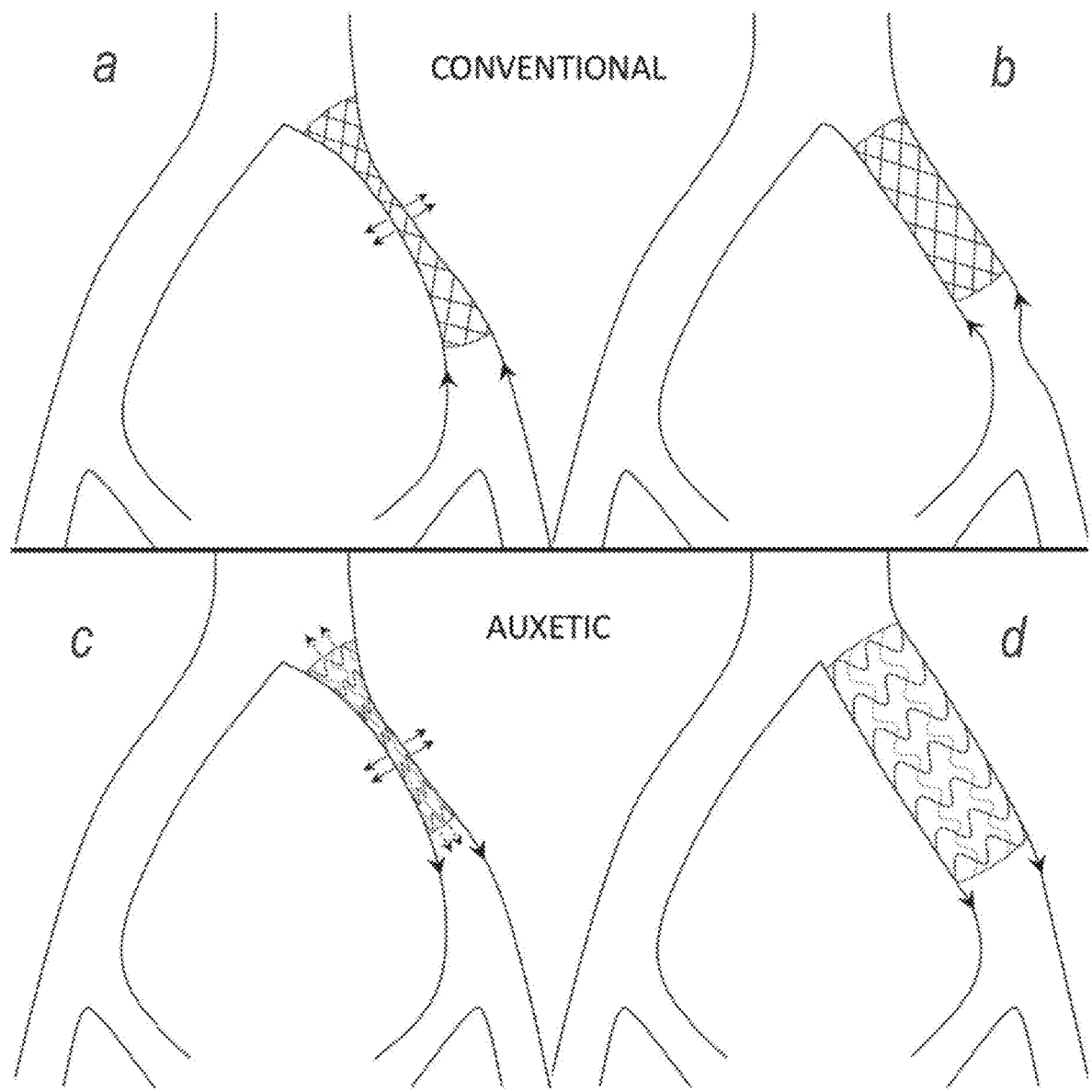
FIG. 11 depicts a comparison of the configurations of a standard (non-auxetic) stent as deployed in a vein, compared to the configurations of an auxetic stent as deployed in the vein, according to various embodiments.

In FIG. 11, the application of a stent 100 in the context of a blood vessel is depicted, as compared to the application of a non-auxetic stent. Panels (a) and (b) depict application of a non-auxetic stent. In panel (a), the stent is placed into position, and radial expansion is commenced. As denoted by the arrows, a radial expansion in a non-auxetic stent results in a corresponding decrease in axial length, shown in panel (b) as the expanded stent is of a shorter length than the unexpanded stent. This shortening, combined with the potential for the expanded stent to adhere or pull the blood vessel wall into a compressed configuration as the stent shortens, can place adjacent portions of the blood vessel into tension, and may result in the vessel diameter of the adjacent portions reducing due to the nature of blood vessel tissue and the transference of mechanical stresses. This undesirable reduction of vessel diameter may result in inadequate treatment of the diseased segment and subsequent vessel occlusion, requiring further medical treatment.

Figure 34:
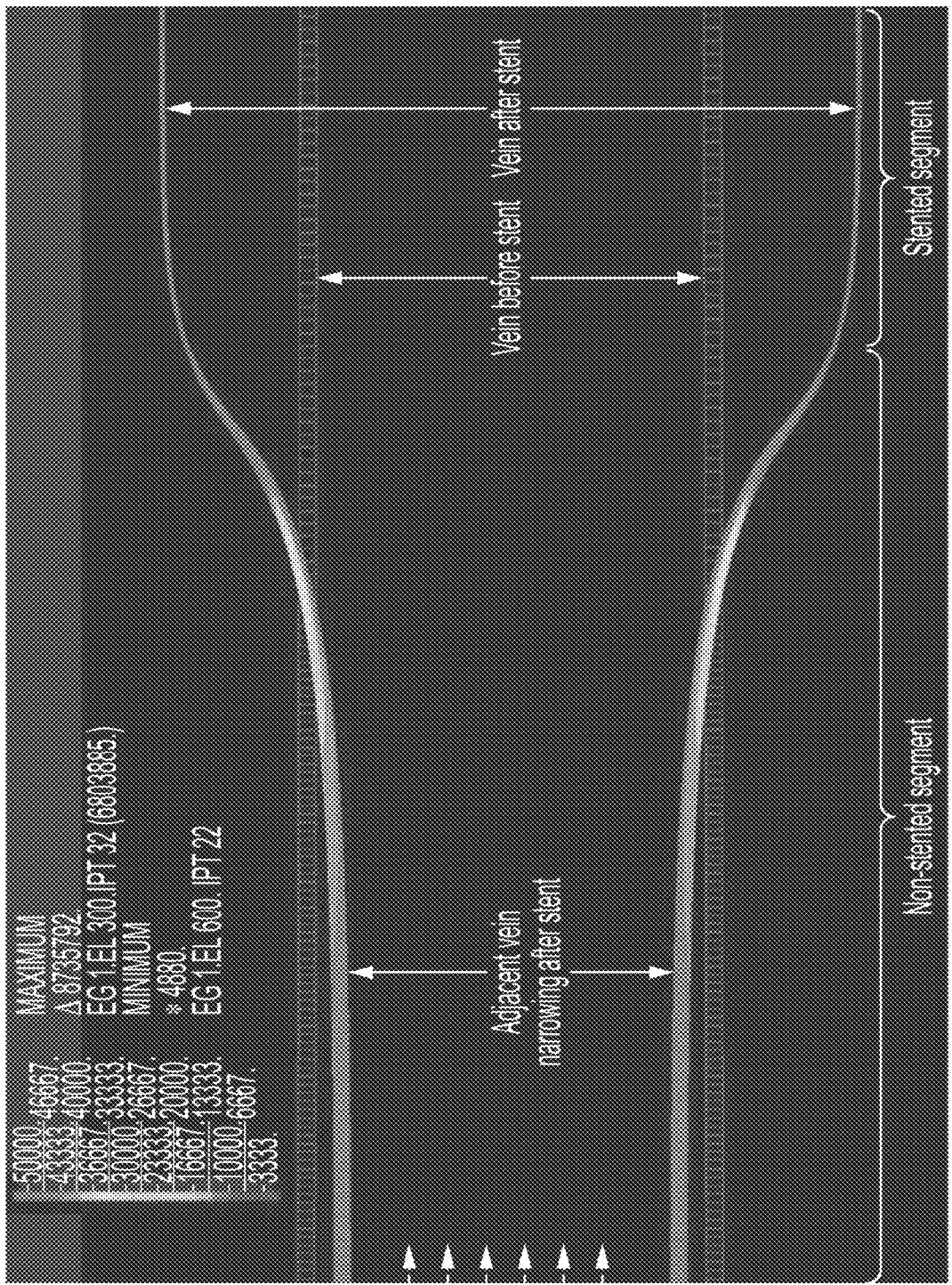
FIG. 34 depicts a finite element analysis model demonstrating narrowing of a non-stented vein section adjacent to a stented vein section.

Panels (c) and (d) depict the use of a stent 100 according to the various embodiments herein. In panel (c), the auxetic stent 100 is placed, and then expanded. In accordance with the properties of stent 100, the stent lengthens axially as it expands radially, shown in panel (d) where the expanded stent 100 is of a greater axial length than the unexpanded stent in panel (c). Because stent 100 expands, it does not place the adjacent vessel portions into tension, as so does not cause the same diameter reduction caused by a non-auxetic stent. Consequently, use of an auxetic stent can improve luminal gain and diminish or altogether eliminate the likelihood of a subsequent vessel occlusion occurring adjacent to the stented vessel portion. FIG. 34 demonstrates this narrowing of adjacent vein walls resulting from placement and expansion of a non-auxetic stent into the vein, as depicted in panel (b), in cross-section, along with the stresses placed on various portions of the vein wall.

Figure 12:
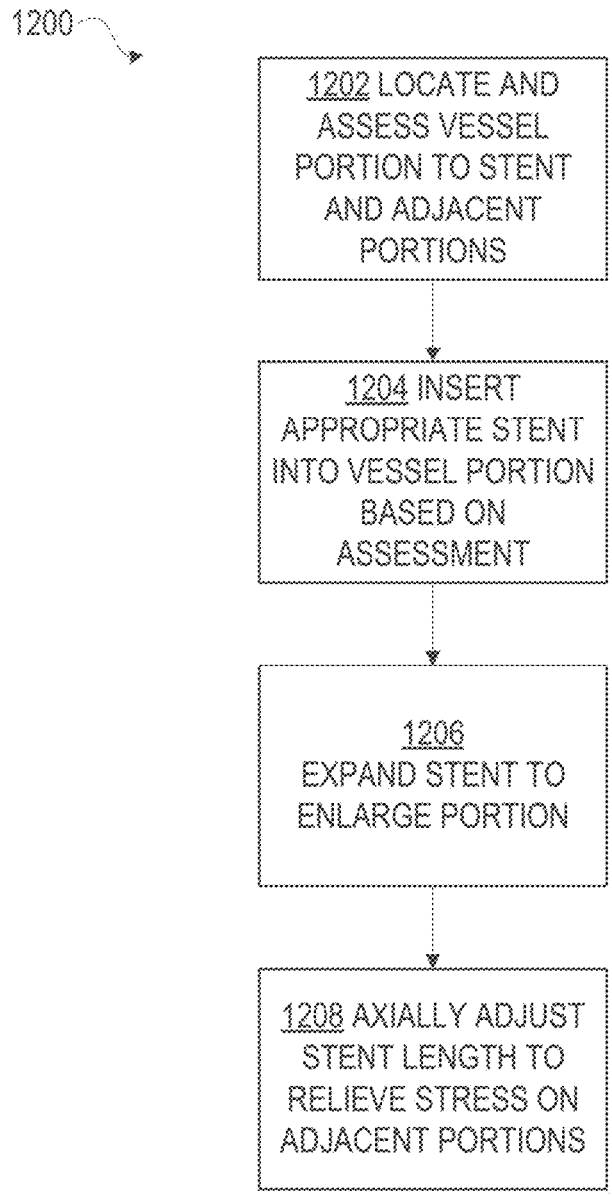
FIG. 12 is a flowchart of an example method for using an auxetic stent in treating venous stenosis, according to various embodiments.

FIG. 12 provides the operations of an example method 1200 for using an auxetic stent, such as stent 100, for treating venous stenosis. The operations of method 1200 may be carried out in whole or in part using a stent 100. In operation 1202, the blood vessel portion requiring treatment is located and assessed, along with the nature of any adjacent vessel portions. Following assessment, in operation 1204 a stent of an appropriate diameter and length, and having the appropriate auxetic properties, e.g. correct or ideal amount of axial expansion to radial expansion, is selected, and then placed into the vessel portion to be treated. In operation 1206, the stent is then expanded radially to the appropriate amount to relieve the vessel portion of occlusion, ensuring appropriate axial expansion.

Finally, in operation 1208, the axial length may be adjusted as appropriate to relieve any stress on the adjacent vessel portions, to prevent the diameter of the adjacent vessel portions from narrowing and to improve luminal gain in the stented vessel portion. In cases where the vessel is curved, axial force may be applied asymmetrically, e.g. greater on one part of the circumference, to cause the cross members on only one portion of the stent 100 to compress or lengthen, thereby allowing stent 100 to be curved to fit the shape of the vessel while still preventing undesirable narrowing of adjacent vessel diameter. As discussed above, the axial force may be a compression, to cause the cross members to bend and shorten the axial length, or a stretching, to cause the cross members to straighten and lengthen axially, or may be a combination of compression and stretching on different circumference portions of the stent 100 to cause stent 100 to assume a curved configuration while expanded.

It will be appreciated that stent 100, in the disclosed embodiments, may operate in a range of diameter configurations, including a compressed diameter suitable for delivery into a vessel, a fully expanded diameter which may be equal to or larger than the maximum expected diameter of the target vessel, and any of a continuous range of intermediate diameters between these two extremes. In typical use, when stent 100 is expanded from its compressed state at the site of intervention, it may first come into contact with the vessel at an intermediate diameter. The diameter of first contact may be smaller than the desired diameter for an optimal therapeutic result. Accordingly, after first contacting the vessel, stent 100 may then be further expanded in diameter, to achieve the desired vessel lumen diameter. This additional expansion may be caused by the desirable elastic or superelastic properties of the stent 100, and may be further aided by adjunctive interventions such as balloon venoplasty. Given the auxetic properties of stent 100, such additional expansion will be accompanied by simultaneous increase in axial length, which may be controlled or constrained, as described above.

It will be further appreciated that alternate embodiments of an auxetic stent may be readily generated based on a unit cell geometry (such as the one depicted in FIGS. 5 and 6) by varying the size of the unit cell and the number of unit cells connected circumferentially to form a tubular configuration. In various embodiments, the number of cells connected circumferentially to form a tubular configuration in a stent may vary between 4 cells and 50 cells, with the cells sized to produce stent diameters between 1 mm and 100 mm after radial expansion. Similarly, unit cells may be combined in the axial direction to generate stent of different length. As such, using the approaches described herein, stents may be produced that are suitable for deployment into vessels of varying sizes for different applications or mechanical effect.

Figure 13:
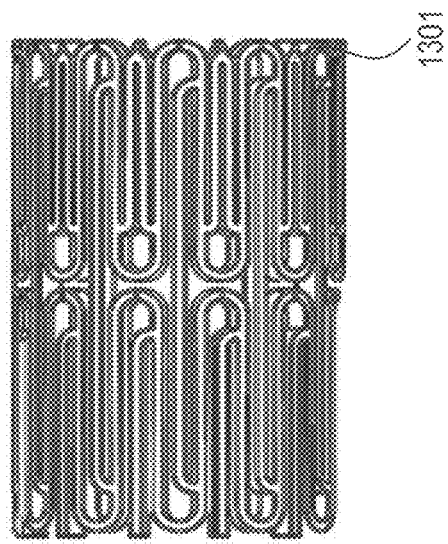
FIG. 13 depicts end and center segments of an auxetic stent, including axial barb engagement features, in a compressed configuration, according to various embodiments.
Figure 13:
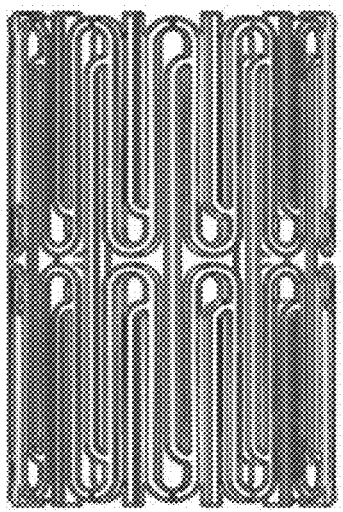
Figure 13:
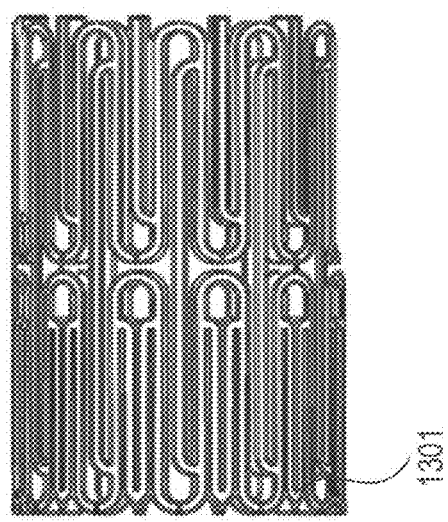
Figure 14:
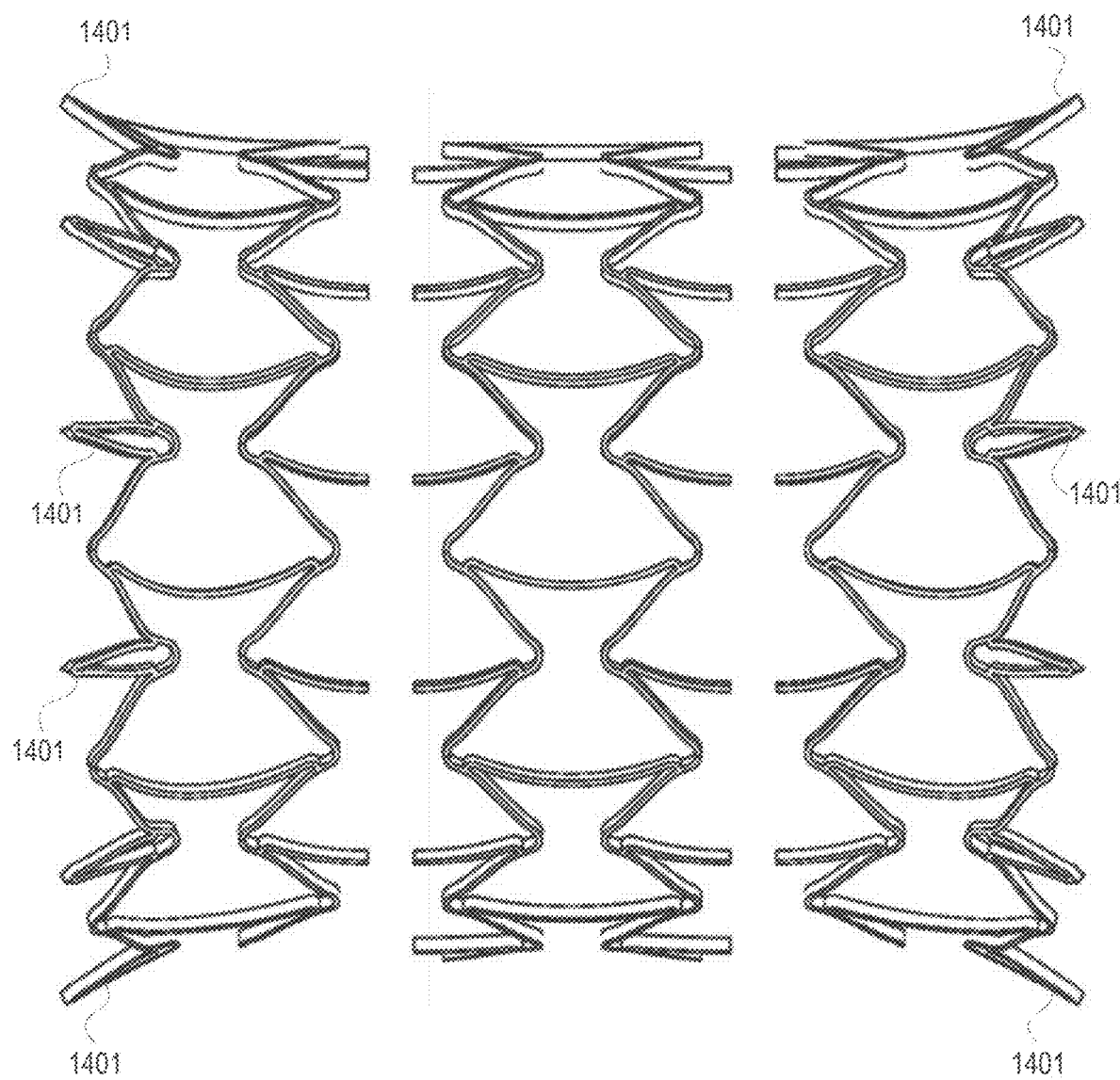
FIG. 14 depicts the end and center segments of the auxetic stent of FIG. 13, including axial barb engagement features, in an expanded configuration, according to various embodiments.

Referring to FIGS. 13 and 14, the benefits of axial lengthening during expansion may be further enhanced in some embodiments by the use of axial engagement barb features 1401. One or more of such features may be positioned in a circumferential array at either or both of the ends of the auxetic stent, as shown in their compressed state in 1301, and in an expanded state in 1401. FIGS. 13 and 14 depict separated sections of a complete stent 100 with barbs positioned at both ends, and as can be seen, cells that adjoin other cells, e.g. not the end of the stent, lack barb features. However, such barb features may also be positioned within the body of the stent, in any number or arrangement to achieve desirable engagement with the vessel. When the auxetic stent 100 is expanded, these features may be designed to protrude at an angle, as may be seen in FIG. 14, such that the tip of the barb is elevated from the other features, and therefore makes contact with the vessel earlier than the body of the stent. Furthermore, such a protruding barb configuration may aid in providing contact between the stent 100 and the vessel during the above described additional expansion, commonly described as post-dilation. The presence of the barbs improves the axial coupling between the stent and contacted vessel. Therefore, such barbs may aid in transmitting the axial lengthening of the stent directly to the vessel, avoiding axial slippage between the stent and vessel, and maximizing the axial tensile force imparted to the vessel in the region of the contact with the stent. Further, such barbs may facilitate or otherwise assist with longitudinal coupling with the vessel wall, helping to hold the expanded stent in position. As stent 100 expands axially in response to either radial expansion or by direct stretching, the barbs may act to place tension on the vessel wall in the stented vessel portion, while relieving tension on the vessel wall of vessel portions adjacent to the stent 100, helping to prevent narrowing. Still further, in other embodiments, variations of a barb may be employed for longitudinal coupling, such as surface roughening of the stent; inclusion of barbs of different sizes, such as micro barbs and/or macro barbs, or a combination of the two; and/or varying the surface texture of the stent; or a combination of one or more of the foregoing.

Auxetic Stent Animal Experiment

Procedure

Figure 15:
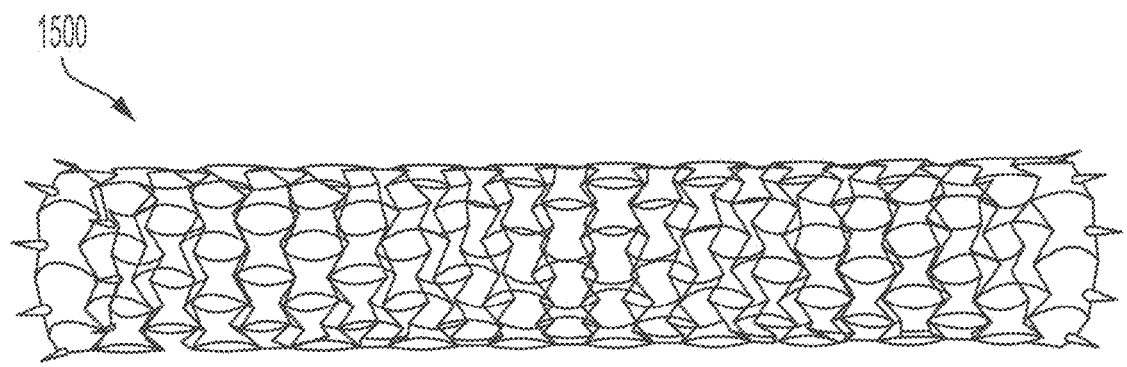
FIG. 15 depicts an example auxetic stent manufactured with a configuration similar to the stents depicted in FIGS. 13 and 14, according to various embodiments.
Figure 16:
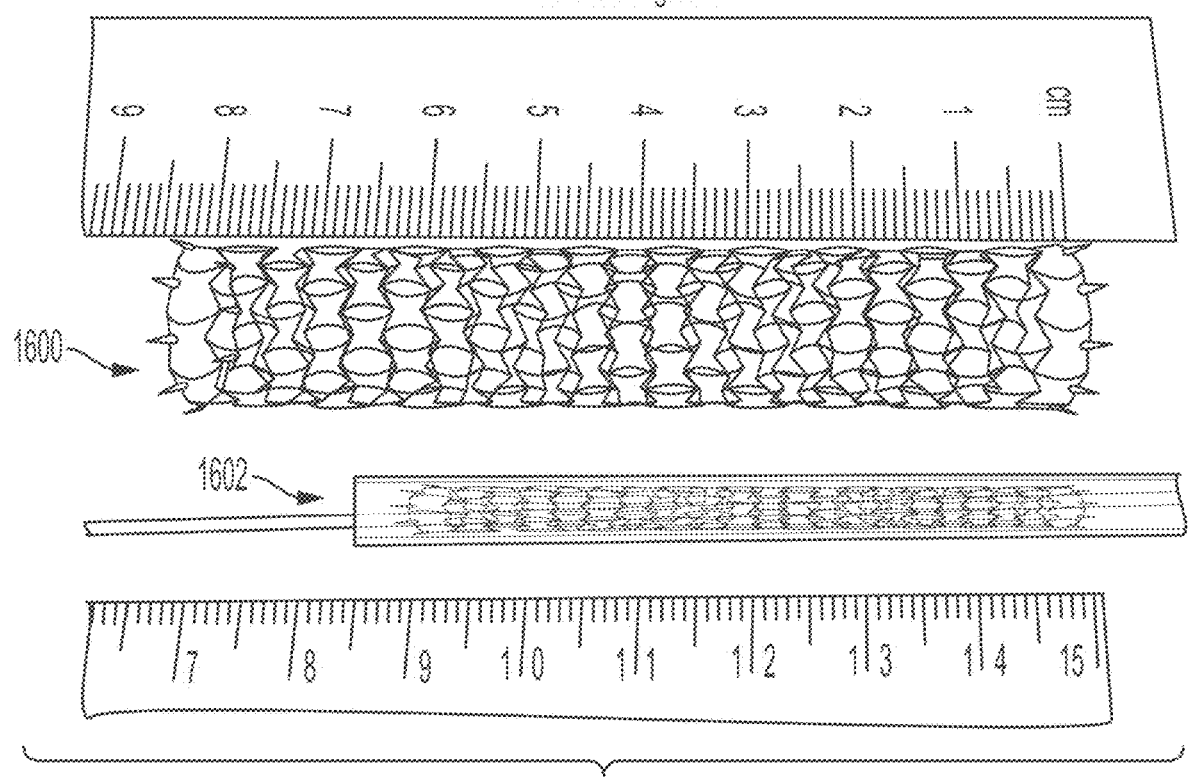
FIG. 16 depicts two example auxetic stents with a configuration similar to the stent depicted in FIG. 15, with one stent expanded and the other stent compressed and loaded into a catheter, according to various embodiments.

FIG. 15 depicts an example stent 1500, which is constructed from a set of 10 cell, 14 mm diameter self-expanding nitinol auxetic stents having barbs on the proximal and distal stent ends, similar to the embodiment depicted in FIG. 14. FIG. 16 shows an auxetic stent 1600 in the expanded configuration, where the expanded stent length is 7.7 cm, alongside a catheter-loaded stent 1602, where the constrained stent length within the catheter is 6.0 cm. As depicted in FIG. 16, the 14 mm diameter self-expanding nitinol auxetic stents were loaded onto an 18-gauge Hawkins needle using liquid nitrogen, and then loaded into a 14 French catheter.

FIGS. 17 to 19B depict the experimental results of deploying an auxetic stent, such as the example stent 1500, in an animal. Ultrasound-guided access was obtained into the bilateral femoral veins of a pig under anesthesia. Through the right femoral vein, the wire was advanced into the inferior vena cava (IVC) and an 18 French sheath placed. The stent was loaded into the sheath using the 18-gauge introducer Hawkins needle, and the introducer needle was removed. Using a 14 French modified dilator, the catheter was advanced into the right common iliac vein and the stent deployed within unsheathing technique. A repeat venogram was performed. The stent was then angioplastied with a 14 mm diameter balloon, 6 cm in length. A repeat venogram was performed.

A 7 French sheath was then placed to the left femoral vein access. Using the previously described technique, a radiofrequency ablation catheter was advanced into the left common iliac vein and external compression applied. Serial ablations with 40 second intervals were performed until a greater than 70% stenosis was achieved. A repeat venogram was performed. An 18 French sheath was advanced into the left common iliac vein and the auxetic stent deployed centered within the left common iliac vein stenosis. A repeat venogram was performed. Balloon angioplasty of the stent was performed with a 12 mm diameter balloon followed by a 14 mm diameter balloon. A second auxetic stent was deployed extending below the inguinal ligament. A repeat venogram was performed. The stent was then ballooned and angioplasty in the stent performed with a 12 mm diameter balloon. Venograms were performed in neutral and flexion positions of the left hip. A third auxetic stent was deployed through the left femoral vein access extending from the IVC into the left common iliac vein. The IVC and left iliac stents were then ballooned with a 14 mm diameter balloon. A final set of venograms were performed.

In a separate animal, ultrasound-guided access was obtained in the right femoral vein. A baseline venogram was performed. Using the previously described technique, a radiofrequency ablation catheter was advanced into the left common iliac vein and external compression applied. Serial ablations in 40 second intervals were performed until a greater than 70% stenosis was achieved. A repeat venogram was performed. A 14 mm diameter stent of a type that is currently available in the market (currently available stent) was deployed in the right common iliac vein. A repeat venogram was performed. Balloon angioplasty of the stent was performed with a 12 mm diameter balloon followed by a 14 mm diameter balloon. A final repeat venogram was performed.

Results

Figure 17:
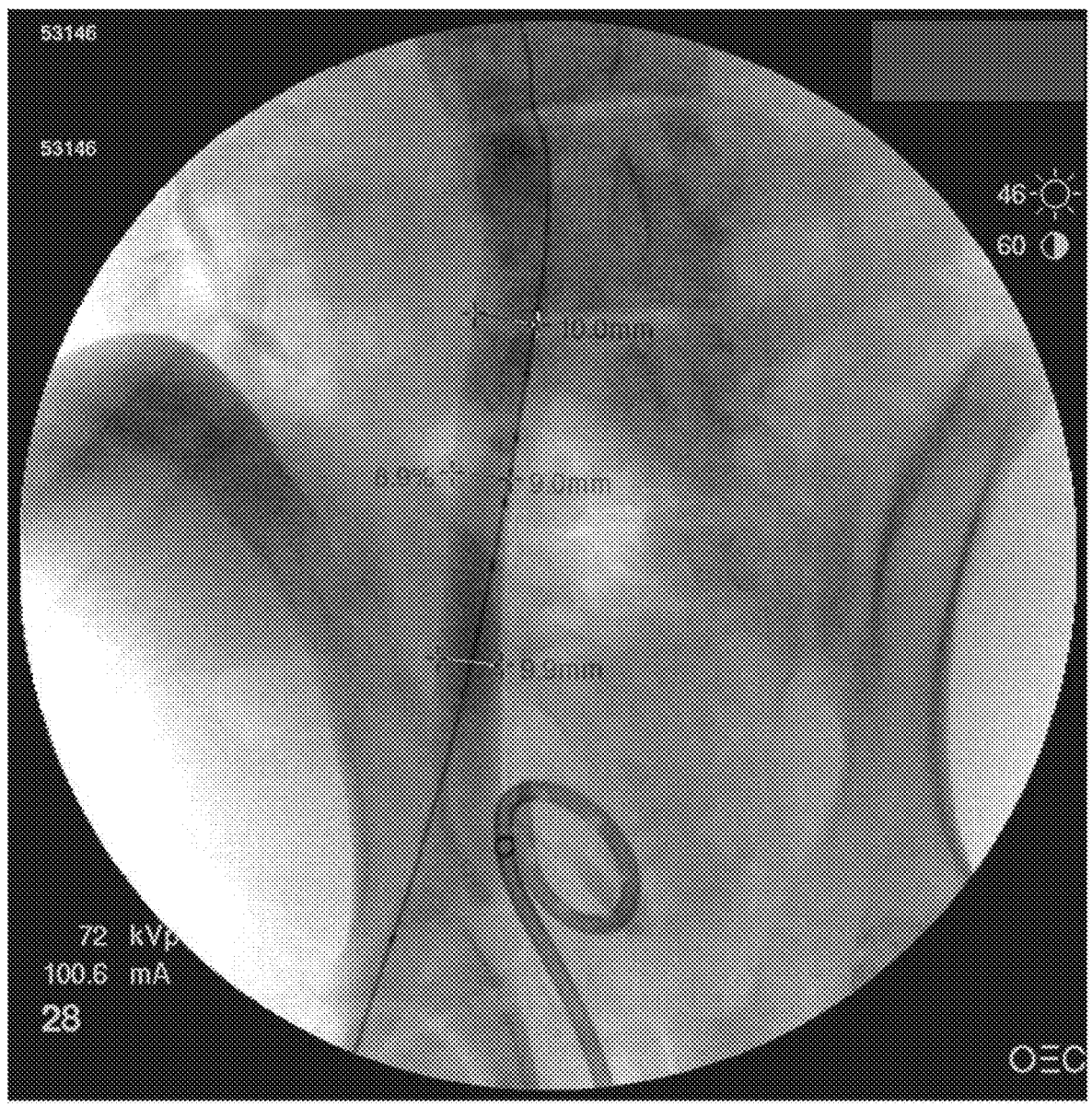
FIG. 17 is a venogram of a normal iliac vein before deployment of a stent, such as a stent similar to the stent depicted in FIG. 15.
Figure 18:
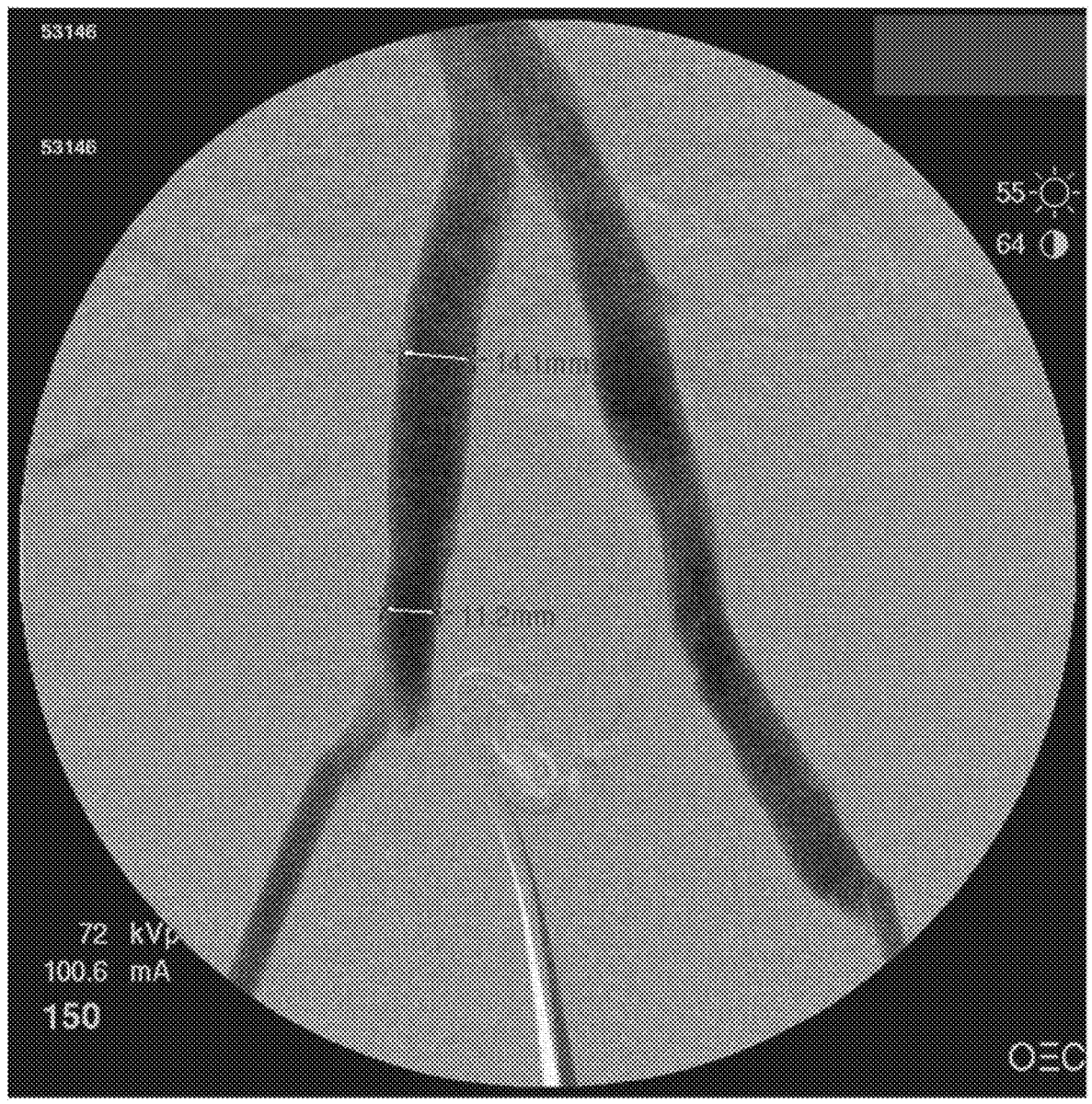
FIG. 18 is a venogram of the iliac vein depicted in FIG. 17 following deployment of a stent, such as a stent similar to the stent depicted in FIG. 15.

FIG. 17 shows a venogram of a normal iliac vein before stent deployment with the pre-stent vein diameters labeled. The auxetic stent was deployed in the right common iliac vein with no difficulty. The stent deployed with radial expansion to the vein wall. After balloon dilation of the auxetic stent with a 14 mm diameter balloon in the healthy right common iliac vein, the diameter of the vein increased from 9 mm to 14.1 mm, representing a 56.7% increase in diameter of the vein. The diameter of the vein adjacent to the stent was 9.9 mm before any intervention, and 11.2 mm after placement and ballooning of the stent. This represents a 13.1% increase in diameter of the adjacent vein despite no direct intervention. FIG. 18 shows the same region after deployment of the 10 cell, 14 mm auxetic stent, angioplastied with a 14 mm×6 cm balloon.

A stenosis greater than 70% was successfully created in the common iliac vein of both the auxetic and the currently available stent animal models. After placement of the currently available stent, the diameter increased to 76.5% relative to the native vein diameter. After ballooning of the currently available stent, the diameter increased to 93.8% relative to the native vein diameter. After placement of the auxetic stent, the diameter increased to 70.1% relative to the native vein diameter. After ballooning of the auxetic stent with a 14 mm diameter balloon, the diameter increased to 174.7% relative to the native vein diameter.

Figure 19A:
FIGS. 19A and 19B are venograms of a vein with an auxetic stent in place, similar to the stent depicted in FIG. 15, in hip extension and flexion positions.
Figure 19B:

FIGS. 19A and 19B shows venograms taken in the hip extension and 90 degree hip flexion positions with an auxetic stent in place. The annotated measurements of vein diameter confirmed that the stent maintained normal venous flow and diameter.

Figure 35:
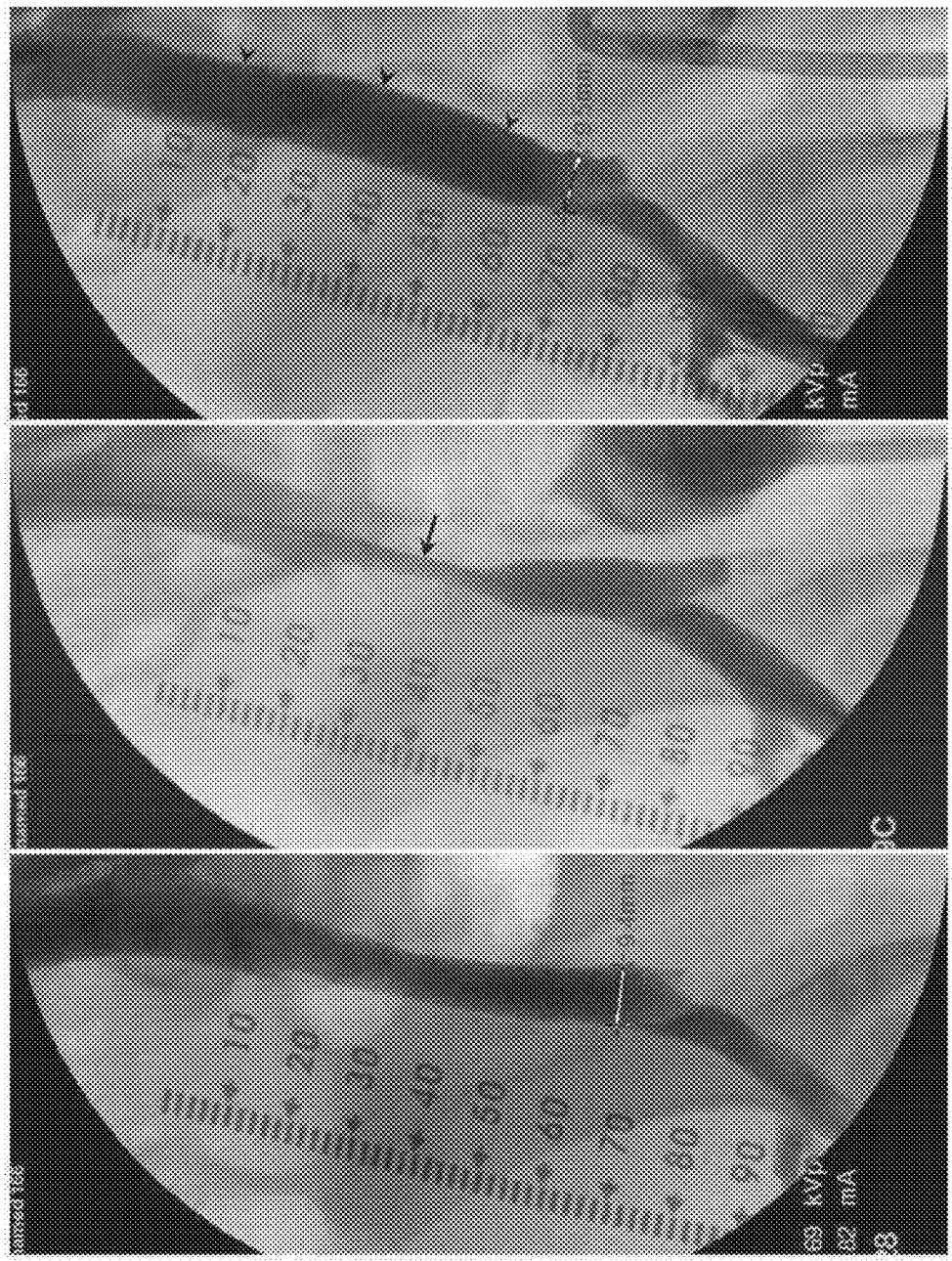
FIG. 35 depicts three venograms: the left, a normal vein venogram; the middle, a narrowed vein using an endovenous radiofrequency ablation technique; and the right, a venogram following deployment of an auxetic stent.

FIG. 35 depicts venograms of another vein at each operation in the procedure: the left venogram depicts a normal vein with a diameter of 9.4 mm; the middle venogram depicts a narrowed vein following endovenous radiofrequency ablation; and the right venogram depicts the ablated vein with an auxetic stent in place, restoring the vein to a diameter of 9.5 mm.

Figure 36:
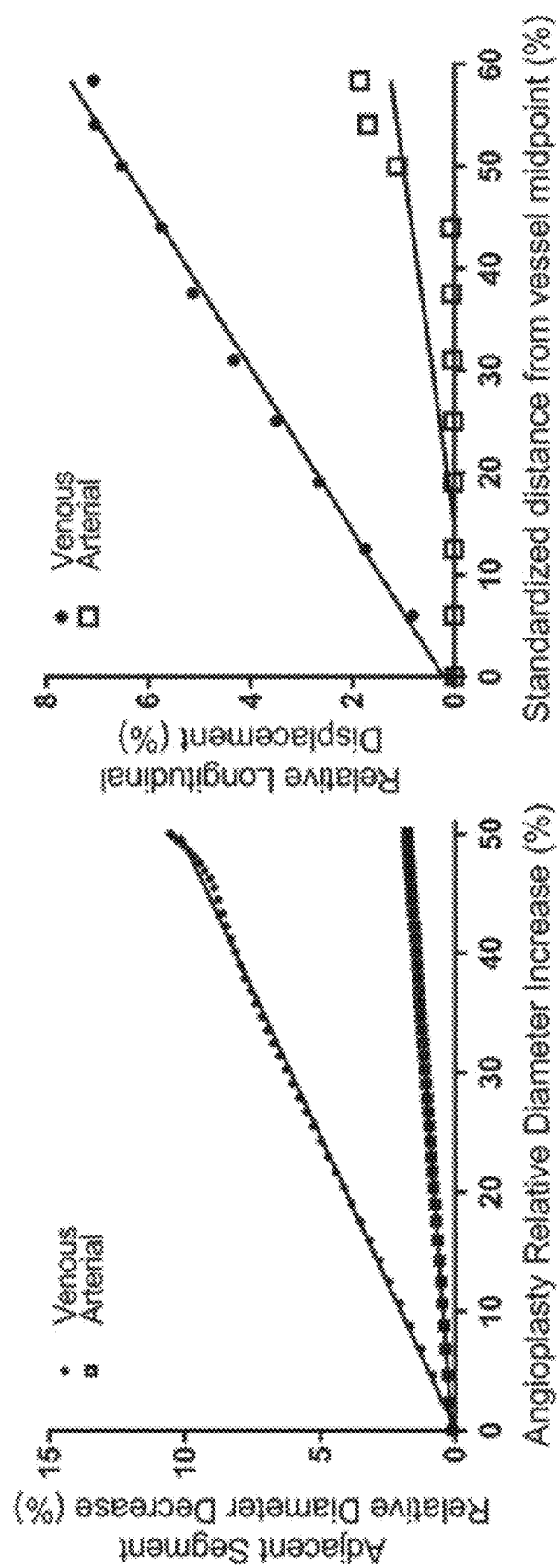
FIG. 36 depicts graphs from a finite element analysis of vascular models, demonstrating a higher relative adjacent vessel diameter reduction during angioplasty in veins relative to arteries (left graph), and a higher vessel wall longitudinal displacement/strain during angioplasty in veins relative to arteries (right graph).

The use of a stent may have differing results between veins and arteries, due to the comparatively thicker and more robust wall of an artery, needed to handle higher arterial blood pressure. FIG. 36 depicts two graphs from finite element analysis vascular models, demonstrating higher relative adjacent vessel diameter reduction during angioplasty in veins relative to arteries (left), and higher vessel wall longitudinal displacement/strain during angioplasty in veins relative to arteries (right). Thus, using an auxetic stent in the context of a vein may yield more dramatic results when compared to an artery.

Figure 20:
FIG. 20 depicts the inferior vena cava with an auxetic stent in place, similar to the stent depicted in FIG. 15.
Figure 37:
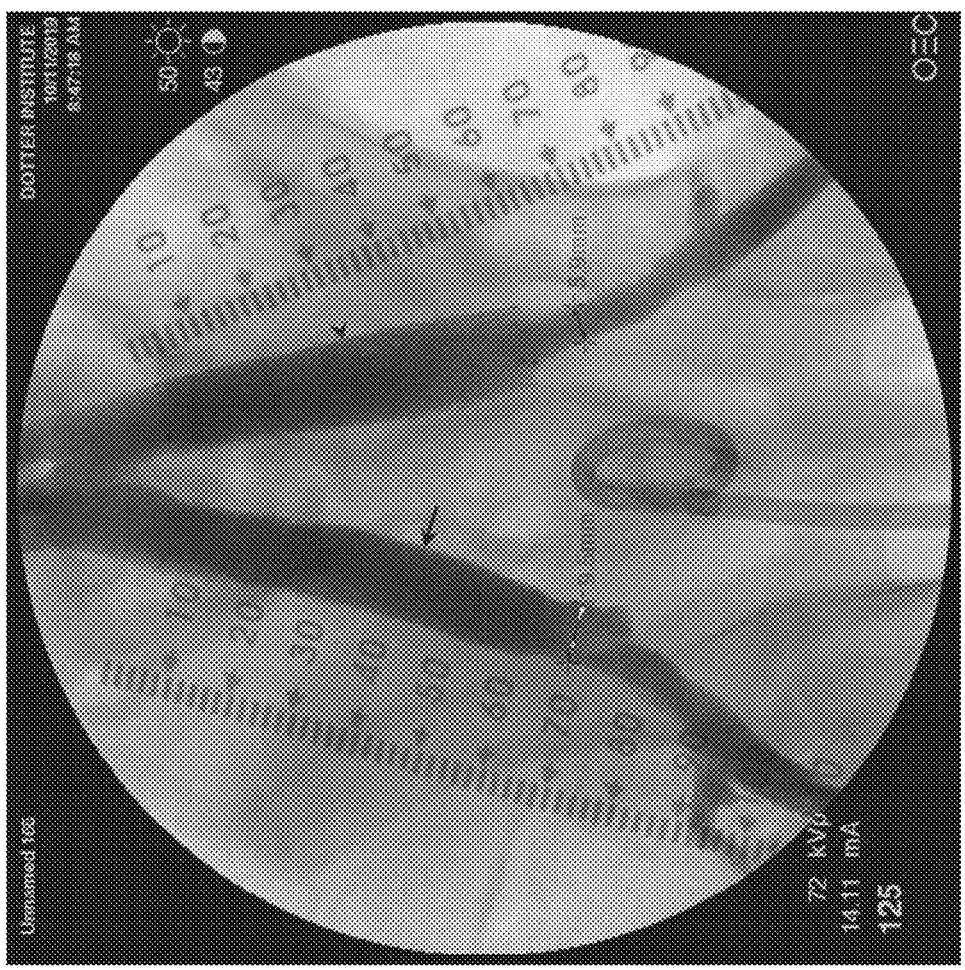
FIG. 37 depicts a comparison of vein structure with an auxetic stent placed in the left vein, and an open cell stent on the right, with narrowing of the diameter of the vein adjacent to the open cell stent.

FIG. 37 depicts a venogram comparing example results of an auxetic (left side) versus non-auxetic (right side) stent deployed in a vein. As can be seen, the auxetic stent in the depicted example has comparatively little narrowing of the vein adjacent to stent placement (~9.5 mm), while the non-auxetic stent exhibits substantial narrowing in the adjacent vein wall (~5.9 mm). Finally, FIG. 20 shows a direct surgical visualization of the inferior vena cava after placement of a barbed auxetic stent. As may be seen, no vein injury is visible on direct inspection.

Conclusion

The auxetic self-expanding stent successfully deployed and dilated both healthy and stenotic veins, successfully achieving luminal gain to the diameter of the balloon without narrowing of the adjacent vein. In comparison, the currently available stent could not achieve luminal gain to the diameter of the balloon. These relative findings confirm that luminal gain can be improved with use of an auxetic stent over a closed cell stent. In addition, imaging of the auxetic stented vein with the hip in an extended and flexed position confirmed patency of the vessel in both positions, demonstrating the flexibility of the stent.

Figure 21:
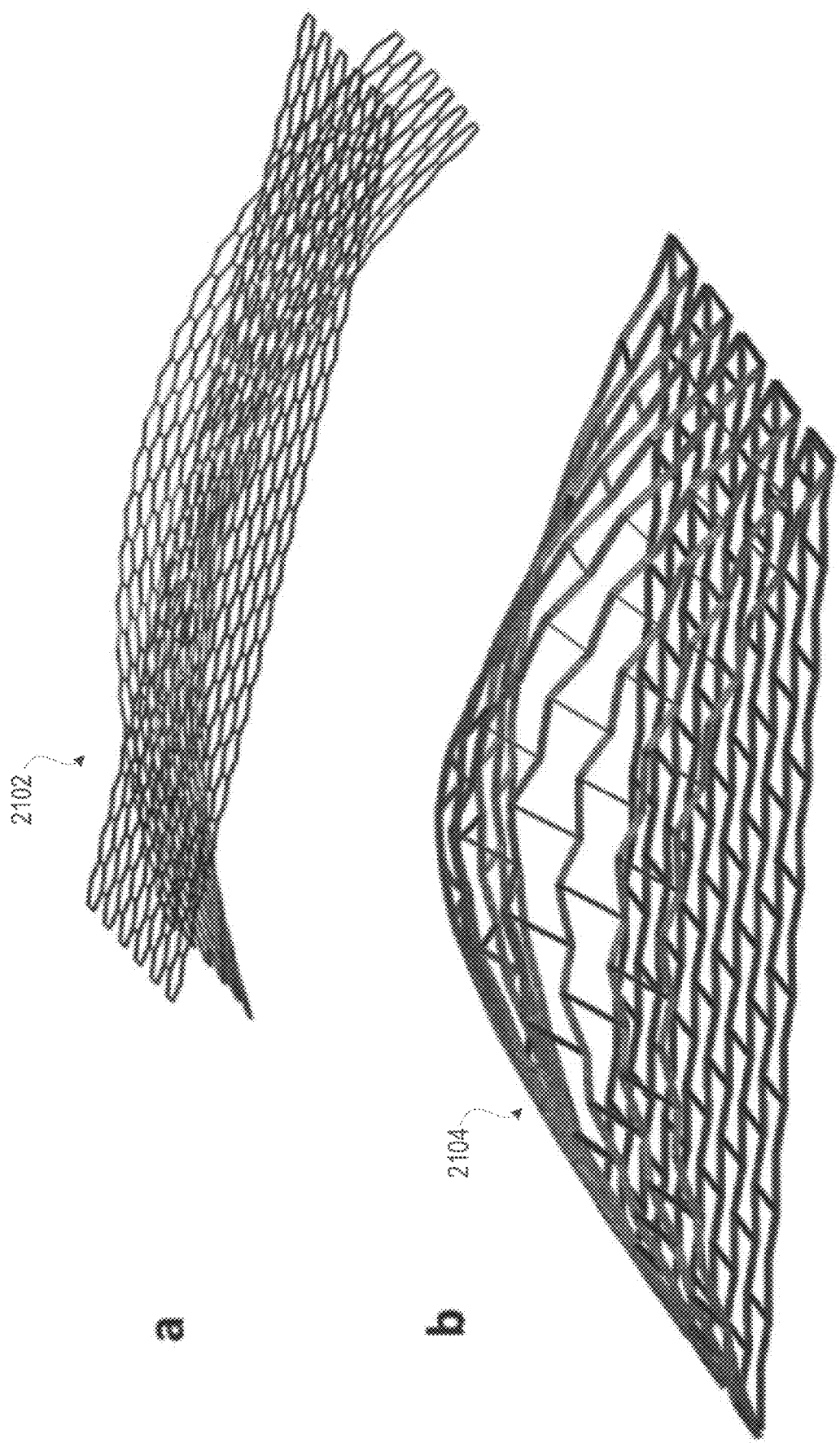
FIG. 21 depicts a comparison of the conformability of a non-auxetic material (a) with an auxetic material (b), according to various embodiments.

Referring to FIG. 21, a further aspect of employing a stent constructed from auxetic material compared to non-auxetic material is depicted. View A depicts the result of applying a pressure to a point on a section 2102 of non-auxetic material. As may be seen, because the non-auxetic material lacks the folded configuration present in the cells of an auxetic stent, the entire section of material bends only along the longitudinal axis, while laterally the material is substantially not deformed. As a result, the piece assumes an overall curved or arced configuration. The lack of lateral deformation could, in some scenarios, hinder a stent constructed of such non-auxetic material from suitably conforming to irregularites in a vein. In contrast, in view B, the result of applying pressure to a point on a section 2104 of auxetic material is depicted. As can be seen, the material deforms and expands both longitudinally and laterally, due to the folded configuration of the constituent cells, forming a dome or bump, rather than an arc. This multi-dimensional deformation allows a stent constructed from such auxetic material to better and/or more precisely conform to irregular features in a vein or other vessel.

Figure 22:
FIG. 22 is a venogram of an auxetic stent in place demonstrating its conformability to vein structure.

FIG. 22 depicts this multi-dimensional deformation of auxetic material in the context of a blood vessel. The venogram depicts a stent 2200, in place within a blood vessel. The stent 2200, following expansion, conforms to irregularities 2202 and 2204 by bulging to form a dome shape, similar to that depicted in view B of FIG. 21. This full expansion helps ensure that full blood vessel opening and blood flow is obtained. Employing a non-auxetic material would have resulted in the stent failing to fully expand and conform into either of the irregularities 2202 and 2204.

It will further be appreciated that stent 100, in the disclosed embodiments, may be deployed in anatomical structures morphologically similar to, but distinct from, vessels such as veins or arteries to facilitate patency of said anatomical structures. Thus, various disclosed embodiments provide a more general method of treating a stricture in a lumen in a mammal, the method comprising implanting a stent 100 as described herein into a lumen, duct, or canal in need thereof. As used herein, the term "stricture" refers to an abnormal narrowing or constriction of a canal, duct, or other lumen in the body that affects normal passage of material (blood, air, food, feces, lymph, urine, saliva, bile, etc.) through the canal, duct, or lumen. As used herein, the term "implanting" refers to placement of a stent as described herein into a position in a duct, canal, or lumen experiencing a stricture, and expanding the stent to treat or alleviate the stricture.

Exemplary non-venous and non-arterial applications include implantation into the bile duct, urogenital tract, gastrointestinal tract, tracheobronchial structures, sinus tract, salivary glands, salivary tubules, salivary ducts, and lymphatic channels. Additional applications include use in surgical procedures such as surgical enterosteotomies, surgical arteriovenous fistulas and grafts, and surgical anastomosis of any two structures within the body.

Also possible is a method of treating a stricture in a cystic duct or common bile duct in a human, the method comprising implanting a stent as described herein into the stricture in the cystic duct or common bile duct in the human in need thereof. A method for treatment of biliary disease in a human wherein the biliary disease is associated with a stricture in the cystic duct or common bile duct may comprise implanting a stent as described herein into a stricture in the cystic duct or common bile duct in the human in need thereof. As used herein "biliary disease" or "biliary tract disease" refers to diseases affecting the bile ducts, gallbladder, and/or other structures involved in the production and transportation of bile, including chronic or acute cholecystis, cholangitis, choledocholithiasis, cholangiocarcinoma, benign biliary tract tumors, ampullary tumors, Mirizzi's syndrome, and AIDS cholangiopathy.

Stents identical or similar to stent 100 (or another embodiment herein) used in treating strictures in a cystic duct or common bile duct or in treating biliary tract diseases may be from about 1 mm to about 30 mm in diameter and from about 5 mm to about 200 mm in length, fully expanded (the specific stent measurements for each specific use herein, unless otherwise specifically stated, are at full expansion of the stent—all diameters are outside diameters). In some embodiments such stents for bile duct use may be from about 5 mm to about 15 mm in diameter and from about 20 mm to about 120 mm in length, fully expanded. In some embodiments, the bile duct stents may be from about 5 mm to about 10 mm in diameter and from about 20 mm to about 120 mm in length. Specific stents for use in biliary treatments include (diameter×length) 5 mm×20 mm, 5 mm×30 mm, 5 mm×40 mm, 5 mm×50 mm, 5 mm×60 mm, 5 mm×70 mm, 5 mm×80 mm, 5 mm×90 mm, 5 mm×100 mm, 5 mm×110 mm, 5 mm×120 mm, 5 mm×130 mm, 5 mm×140 mm, 5 mm×150 mm, 6 mm×20 mm, 6 mm×30 mm, 6 mm×40 mm, 6 mm×50 mm, 6 mm×60 mm, 6 mm×70 mm, 6 mm×80 mm, 6 mm×90 mm, 6 mm×100 mm, 6 mm×110 mm, 6 mm×120 mm, 6 mm×130 mm, 6 mm×140 mm, 6 mm×150 mm, 8 mm×20 mm, 8 mm×30 mm, 8 mm×40 mm, 8 mm×50 mm, 8 mm×60 mm, 8 mm×70 mm, 8 mm×80 mm, 8 mm×90 mm, 8 mm×100 mm, 8 mm×110 mm, 8 mm×120 mm, 8 mm×130 mm, 8 mm×140 mm, 8 mm×150 mm, 10 mm×20 mm, 10 mm×30 mm, 10 mm×40 mm, 10 mm×50 mm, 10 mm×60 mm, 10 mm×70 mm, 10 mm×80 mm, 10 mm×90 mm, 10 mm×100 mm, 10 mm×110 mm, 10 mm×120 mm, 10 mm×130 mm, 10 mm×140 mm, and 10 mm×150 mm.

A method of treating a ureteral stricture in a human may comprise implanting a stent similar to or as described herein into the ureteral stricture in the human in need thereof.

Stents identical or similar to stent 100 (or another embodiment herein) used in treating strictures in the human ureter or in treating urinary tract diseases associated with a uretal stricture may be from about 1 mm to about 100 mm in diameter and from about 5 mm to about 500 mm in length (fully expanded). In other embodiments, uretal stents may comprise from about 1 mm to about 15 mm in diameter and a length of from about 5 mm to about 500 mm in length. In other embodiments, uretal stents may comprise from about 1 mm to about 12 mm in diameter and a length of from about 5 mm to about 500 mm in length. In further embodiments, uretal stents may comprise from about 1 mm to about 3 mm in diameter and a length of from about 5 mm to about 500 mm in length. In further embodiments, uretal stents may comprise from about 1 mm to about 2 mm in diameter and a length of from about 5 mm to about 500 mm in length. Specific stents of the design herein for ureter implantation include those having the diameter×length of 1 mm×10 mm, 1 mm×20 mm, 1 mm×40 mm, 1 mm×60 mm, 1 mm×80 mm, 1 mm×100 mm, 1 mm×120 mm, 1 mm×150 mm, 1 mm×200 mm, 1 mm×250 mm, 1 mm×300 mm, 1 mm×350 mm, 1 mm×400 mm, 1 mm×500 mm, 2 mm×10 mm, 2 mm×20 mm, 2 mm×40 mm, 2 mm×60 mm, 2 mm×80 mm, 2 mm×100 mm, 2 mm×120 mm, 2 mm×150 mm, 2 mm×200 mm, 2 mm×250 mm, 2 mm×300 mm, 2 mm×350 mm, 2 mm×400 mm, and 2 mm×500 mm.

A method of treating a stricture in the gastrointestinal tract in a human may comprise implanting a stent similar to or as described herein into the gastrointestinal tract stricture in the human in need thereof.

A method of treating a stricture in the colon in a human may comprise implanting a stent similar to or as described herein into the stricture in the colon in the human in need thereof.

Stents identical or similar to stent 100 (or another embodiment herein) used in treating strictures in the gastrointestinal tract may be from about 1 mm to about 100 mm in diameter and from about 5 mm to about 500 mm in length (fully expanded).

Colonic stents identical or similar to stent 100 (or another embodiment herein) may be from about 20 mm to about 40 mm in diameter and from about 20 mm to about 150 mm in length. In some embodiments, the colonic stents may be from about 20 mm to about 35 mm in diameter and from about 40 mm to about 140 mm in length. In other embodiments, the colonic stents may be from about 26 mm to about 32 mm in diameter and from about 40 mm to about 120 mm in length.

A method of treating a stricture in the esophagus in a human may comprise implanting a stent similar to or as described herein into the stricture in the esophagus in the human in need thereof.

Esophageal stents identical or similar to stent 100 (or another embodiment herein) may be from about 10 mm to about 25 mm in diameter and from about 3 cm to about 20 cm in length. In some embodiments, the colonic stents may be from about 15 mm to about 25 mm in diameter and from about 5 cm to about 15 cm in length. In other embodiments, the colonic stents may be from about 17 mm to about 23 mm in diameter and from about 5 cm to about 15 cm in length.

A method of treating a tracheobronchial stricture in a human may comprise implanting a stent similar to or as described herein into the tracheobronchial stricture in the human in need thereof.

In some embodiments, the tracheobronchial stents may be from about 5 mm to about 25 mm in diameter and from about 10 mm to about 100 mm in length. In some embodiments the tracheobronchial stents may be from about 6 mm to about 22 mm in diameter and from about 10 mm to about 100 mm in length. Specific examples of tracheobronchial stent sizes for uses here include the expanded diameter× length combinations of from about 8 mm×about 20 mm, about 8 mm×about 30 mm, about 8 mm×about 40 mm, 10 mm×about 20 mm, about 10 mm×about 30 mm, about 10 mm×about 40 mm, about 10 mm×about 60 mm, 12 mm×about 20 mm, about 12 mm×about 30 mm, about 12 mm×about 40 mm, about 12 mm×about 60 mm, 12 mm×about 80 mm, 14 mm×about 20 mm, about 14 mm×about 30 mm, about 14 mm×about 40 mm, about 14 mm×about 60 mm, 14 mm×about 80 mm, 16 mm×about 20 mm, about 16 mm×about 30 mm, about 16 mm×about 40 mm, about 16 mm×about 60 mm, 16 mm×about 80 mm, 18 mm×about 20 mm, about 18 mm×about 30 mm, about 18 mm×about 40 mm, about 18 mm×about 60 mm, 18 mm×about 80 mm, 20 mm×about 20 mm, about 20 mm×about 30 mm, about 20 mm×about 40 mm, about 20 mm×about 60 mm, and about 20 mm×about 80 mm.

A method of treating a salivary duct stricture in a human may comprise implanting a stent similar to or as described herein into the salivary duct stricture in the human in need thereof. Examples of salivary duct stents of use herein include those from about 0.5 mm to about 3 mm in diameter and from about 1 mm to about 40 mm in length.

In some embodiments, the geometry of the unit cell 500 of FIGS. 5-8 comprising an auxeticstent, such as stent 100, may be modified to advantageously impart desired structural properties and mechanical behavior to said stent upon deployment into a lumen. Similarly, the number of cells 500 arranged circumferentially and longitudinally may be selected to impart specific structural properties and mechanical behavior to the stent. For example, various embodiments may employ stents of varying geometry, both at the unit cell level and at the stent device level, to exhibit a range of radial stiffness and axial stiffness values. The selection of radial and axial stiffness, for a given embodiment, in turn governs the force transmitted to a vessel structure in the radial and axial directions when the stent is deployed and expanded within the vessel lumen. Similarly, a stent geometry may be designed or tuned such that a specific amount of extension in the axial direction is produced when a stent device implementing the geometry is expanded in the radial direction. As such, auxetic stents generated using the unit cell approach described herein can be used to actively control the degree of longitudinal force or stress borne by the vessel to which the stent is expanded, both in the vessel wall immediately surrounding the expanded stent and in the vessel adjacent to, or upstream/downstream from, the stent. Such active control of the vessel wall mechanical stresses using auxeticstent designs according to the various embodiments disclosed herein may be employed, for example, to mitigate undesirable narrowing of adjacent vessel diameter commonly observed with the deployment of non-auxetic stents.

In some embodiments, structural properties and mechanical behavior of a stent device comprised of unit cells, such as cell 500, configured according the schematic of FIG. 6 may be adjusted by modifying the locations at which the individual struts are connected. For example, the locations of the junctions 612a and 612b where cross member 610 joins the first and second struts 602 and 604 may be moved closer to, or further from, the respective centers of first segments 602a and 604a. Such a design modification can be employed to alter the amount of axial length change of the stent and the amount of longitudinal stress engendered in the vessel wall when the stent is expanded radially, as well as alter the radial and axial stiffness of the stent. The number of unit cells in a stent's circumferential direction may also be varied to produce changes in stent structural properties and mechanical behavior. It will further be appreciated that variation of strut thickness and/or cross sectional area properties or material properties will also manifest as changes in a stent's radial stiffness, axial stiffness, amount of axial length change during radial expansion, and/or the longitudinal stress engendered in the vessel wall.

Computer aided design and mathematical modeling methods, such as the finite element method, can be used to characterize and compare the mechanical behavior of auxetic stent designs according to the embodiments described herein. FIGS. 23-28 show finite element modeling results for a side-by-side comparison of two example auxetic stent designs each comprised of a circumferential ring of unit cells (such as cell 500), a first embodiment having 10 unit cells, and a second embodiment having 12 unit cells, in the circumferential direction. Simulations were performed to model the mechanical response (i.e., deformation, stress/strain, reaction forces) of each circumferential ring of unit cells, each 14 mm in diameter, when the structures were loaded according to the following regimen: starting from a strain-free configuration 14 mm in diameter, the models were (1) crimped to a diameter of 2.5 mm, (2) deployed (expanded) to a diameter of 12 mm, (3) stretched axially while constraining the diameter at 12 mm, (4) returned to an unstretched state while constraining the diameter at 12 mm, and (5) compressed axially while constraining the diameter at 12 mm.

Figure 23:
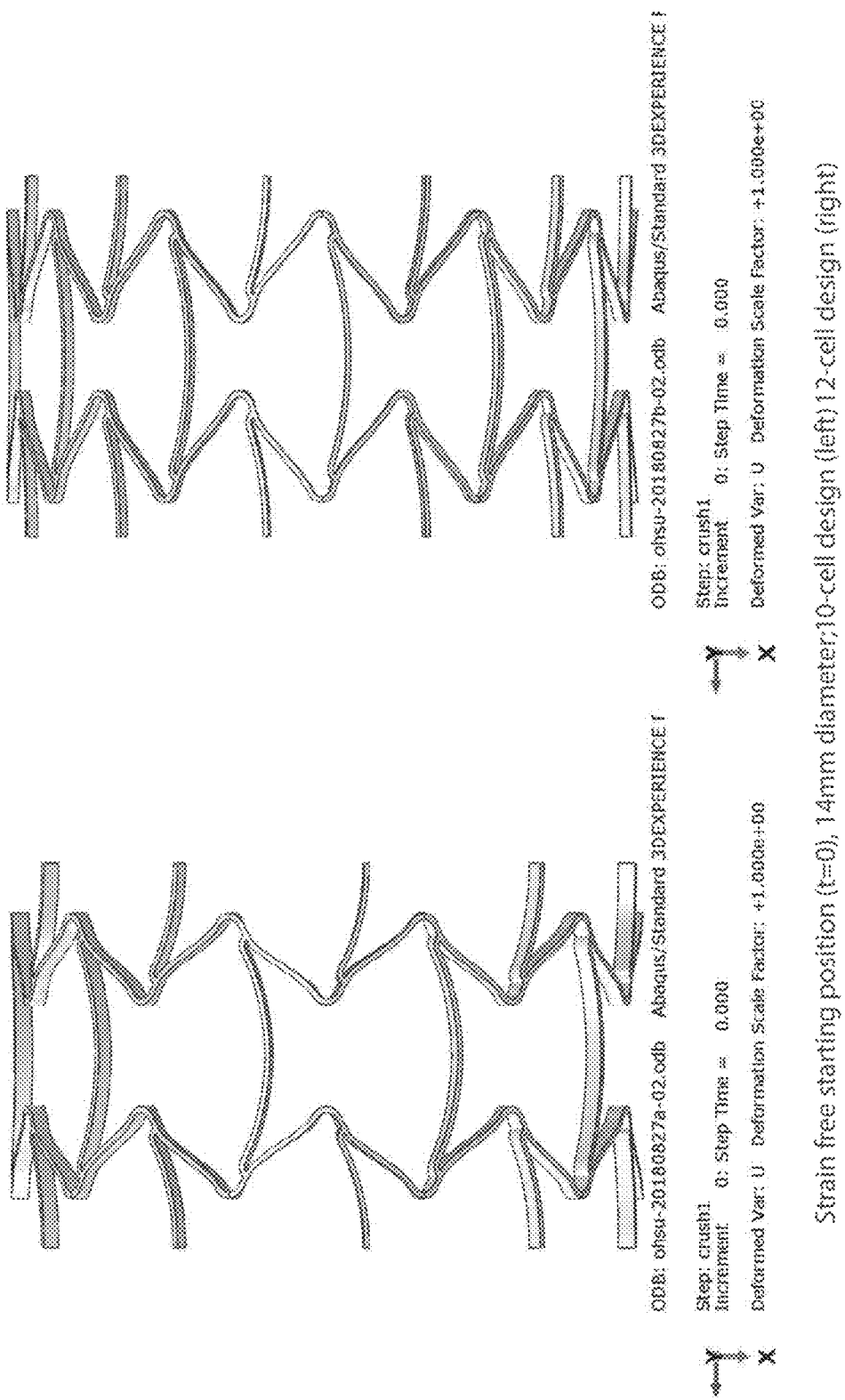
FIG. 23 depict example 10 and 12 cell auxetic stent portions in a strain-free starting position, according to various embodiments.
Figure 24:
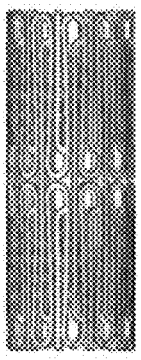
FIG. 24 depicts the example stent portions of FIG. 23 in a crimped position, according to various embodiments.
Figure 24:
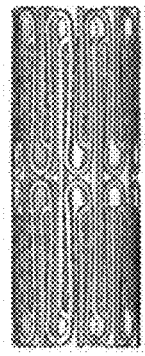

FIG. 23 shows the starting condition of the finite element modeling simulation with the 10-cell and 12-cell models expanded to a diameter of 14 mm. In FIG. 24, both models are crimped to a diameter of 2.5 mm. Maximum strains (not shown) in the fully crimped configuration were calculated to be 7.6% in the 10-cell design and 6.9% in the 12-cell design. These strain levels are within the limits of superelasticity, indicating that both auxetic stent designs should fully recover to 14 mm ID after being constrained to 2.5 mm while exposed to a temperature of 37 degrees C.

Figure 25:
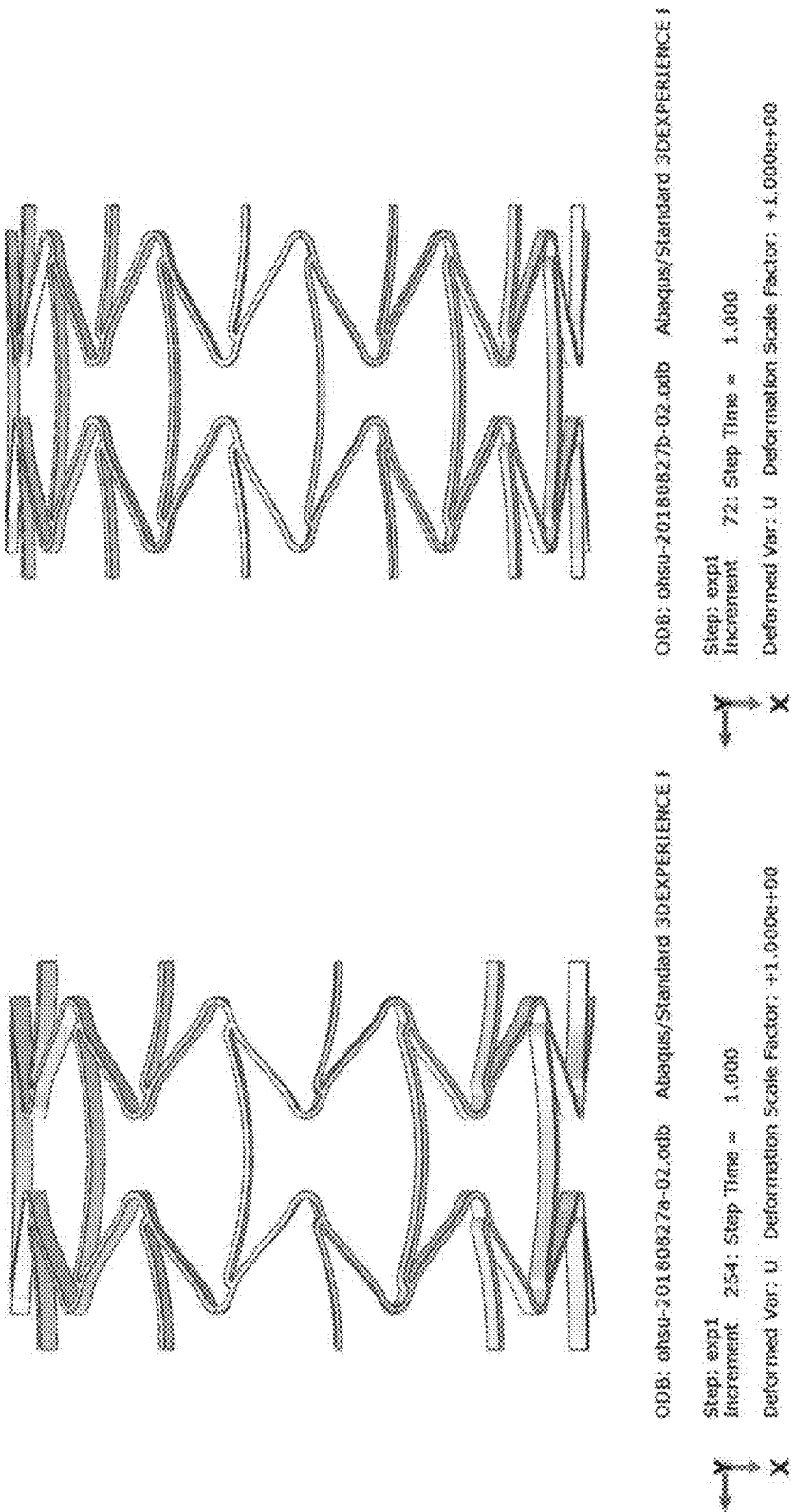
FIG. 25 depicts the example stent portions of FIG. 23 deployed to 12 mm, according to various embodiments.

FIG. 25 shows the configuration of the 10-cell and 12-cell stent designs when the models are deployed or expanded from the crimped configuration to a diameter of 12 mm (wherein 12 mm is intended to represent the stent's final position in a properly dilated vein). Maximum strains in the models in this deployed position are about 2.4%. Note the larger unit cell size in the 10-cell design with the models in this deployed configuration.

Figure 26:
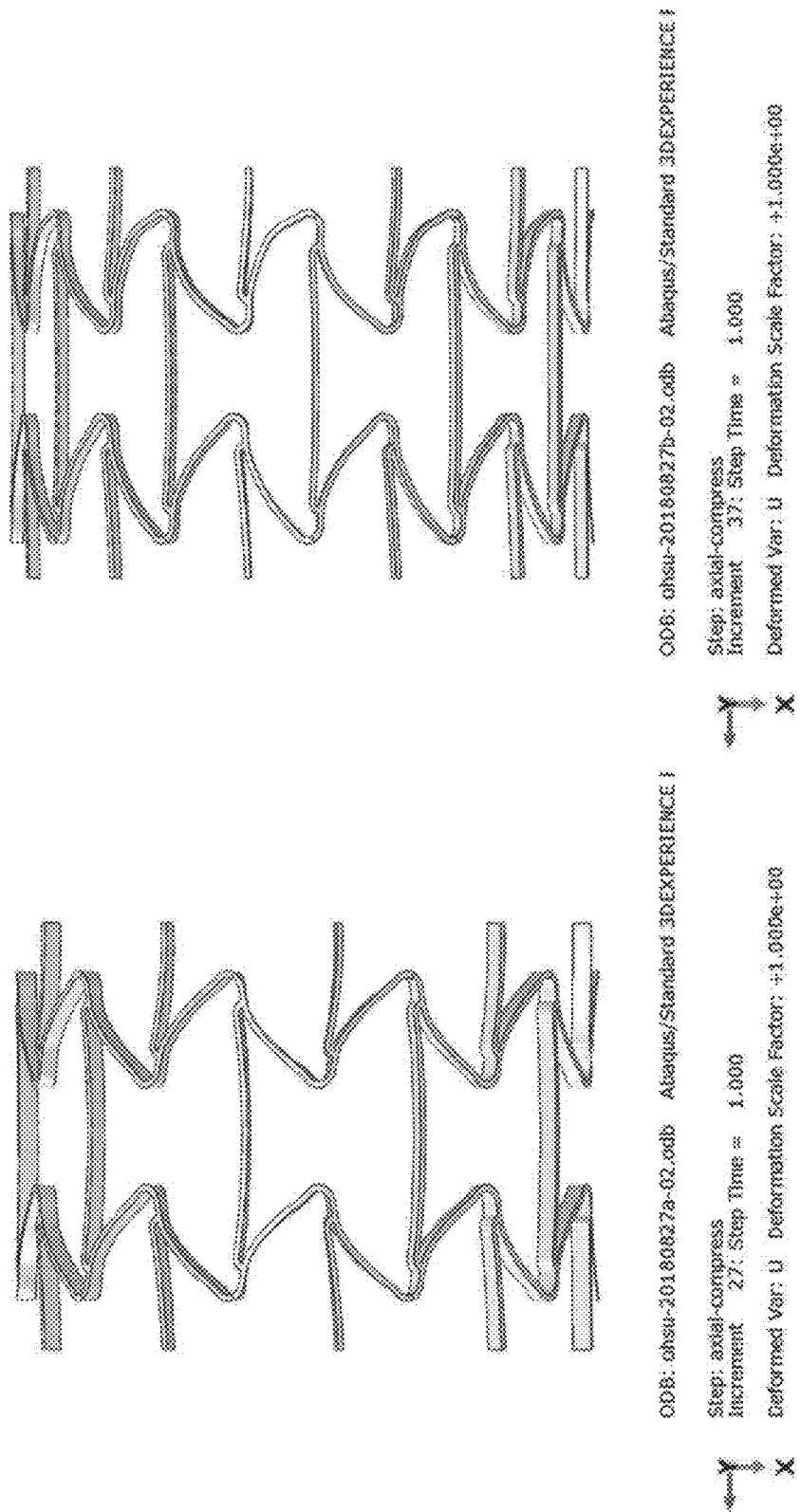
FIG. 26 depicts the example stent portions of FIG. 23 in an axially stretched configuration while radially constrained to 12 mm, according to various embodiments.
Figure 27:
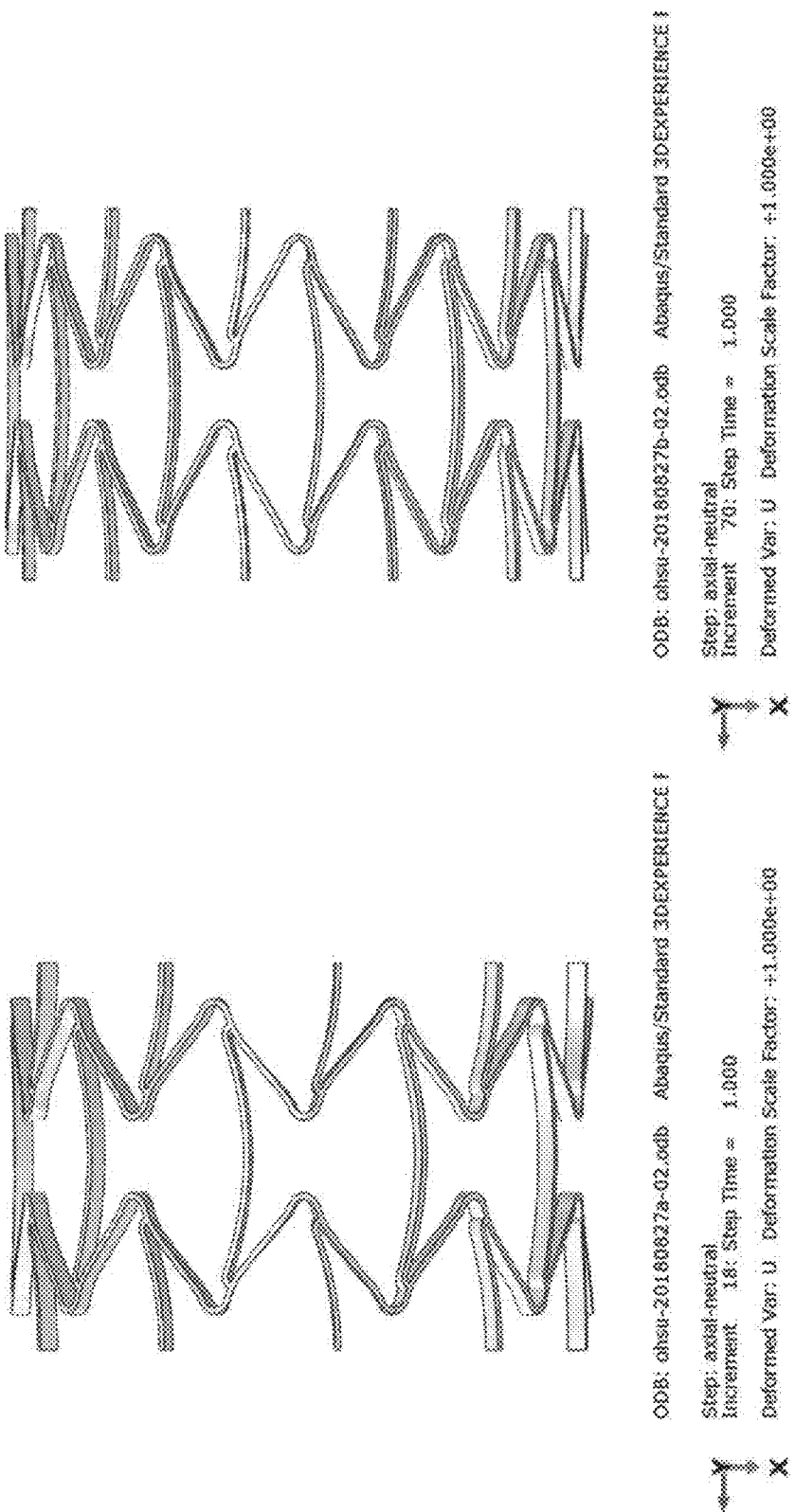
FIG. 27 depicts the example stent portions of FIG. 23, returned to a neutral axial position, according to various embodiments.
Figure 28:
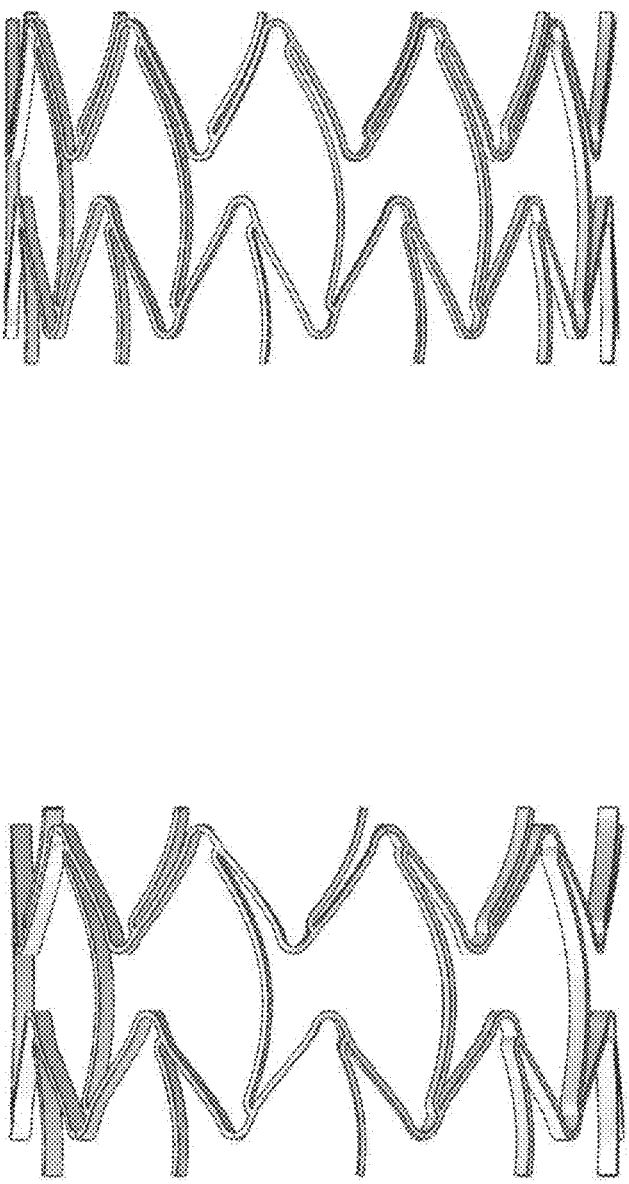
FIG. 28 depicts the example stent portions of FIG. 23 in an axially compressed configuration, while radially constrained to 12 mm, according to various embodiments.

At FIG. 26, the models are stretched in the axial direction while constraining the diameter at 12 mm to characterize the axial stiffness of the overall structure in tension. These simulations show that the 12-cell design has more pronounced strut deformation than the 10-cell design. FIG. 27 shows the models returned to their unstretched configuration, still with the diameter constrained at 12 mm. FIG. 28 shows the models the subjected to axial compression while constraining the diameter at 12 mm to characterize the axial stiffness of the overall structure in compression.

Figure 29:
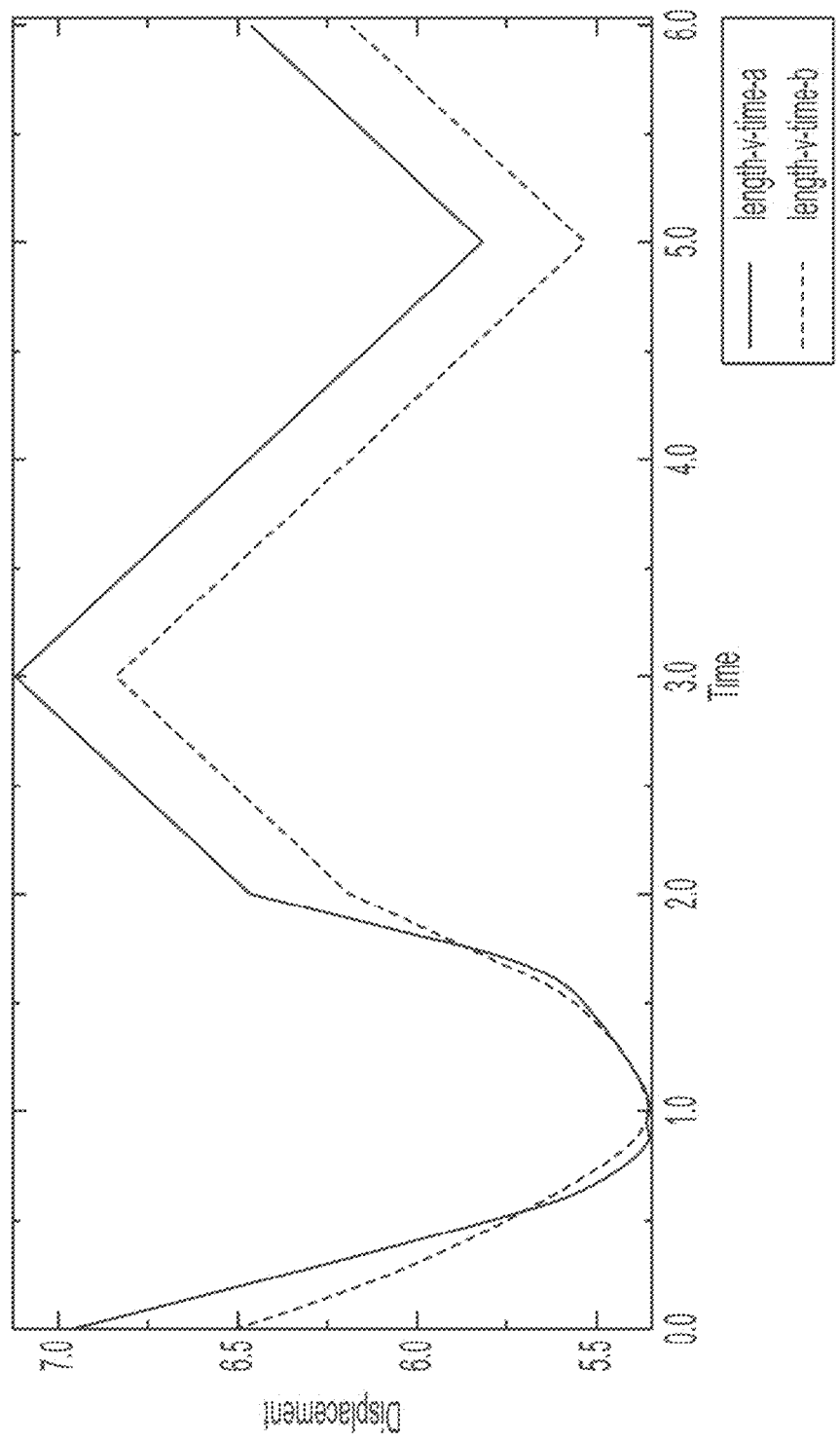
FIG. 29 depicts the cell length for each of the example stent portions of FIG. 23 as each example stent is manipulated through the configurations depicted in FIGS. 24-28, according to various embodiments.

FIG. 29 shows a comparison of the unit cell length of the 10-cell design and the 12-cell design throughout simulation. Time 0-1 represents crimping from 14 mm to 2.5 mm, time 1-2 represents deployment from 2.5 mm to 12 mm, time 2-3 represents stretching in the axial direction, time 3-4 represents returning to the unstretched configuration, time 4-5 represents compressing in the axial direction. The deployment results between time 1-2 illustrate that the 10-cell design embodiment modeled here is "more auxetic" than the 12-cell design embodiment, as the unit cell length of 10-cell design undergoes greater extension or lengthening as the stent expands from the crimped state to the deployed state (i.e., as its diameter is increased).

Figure 30:
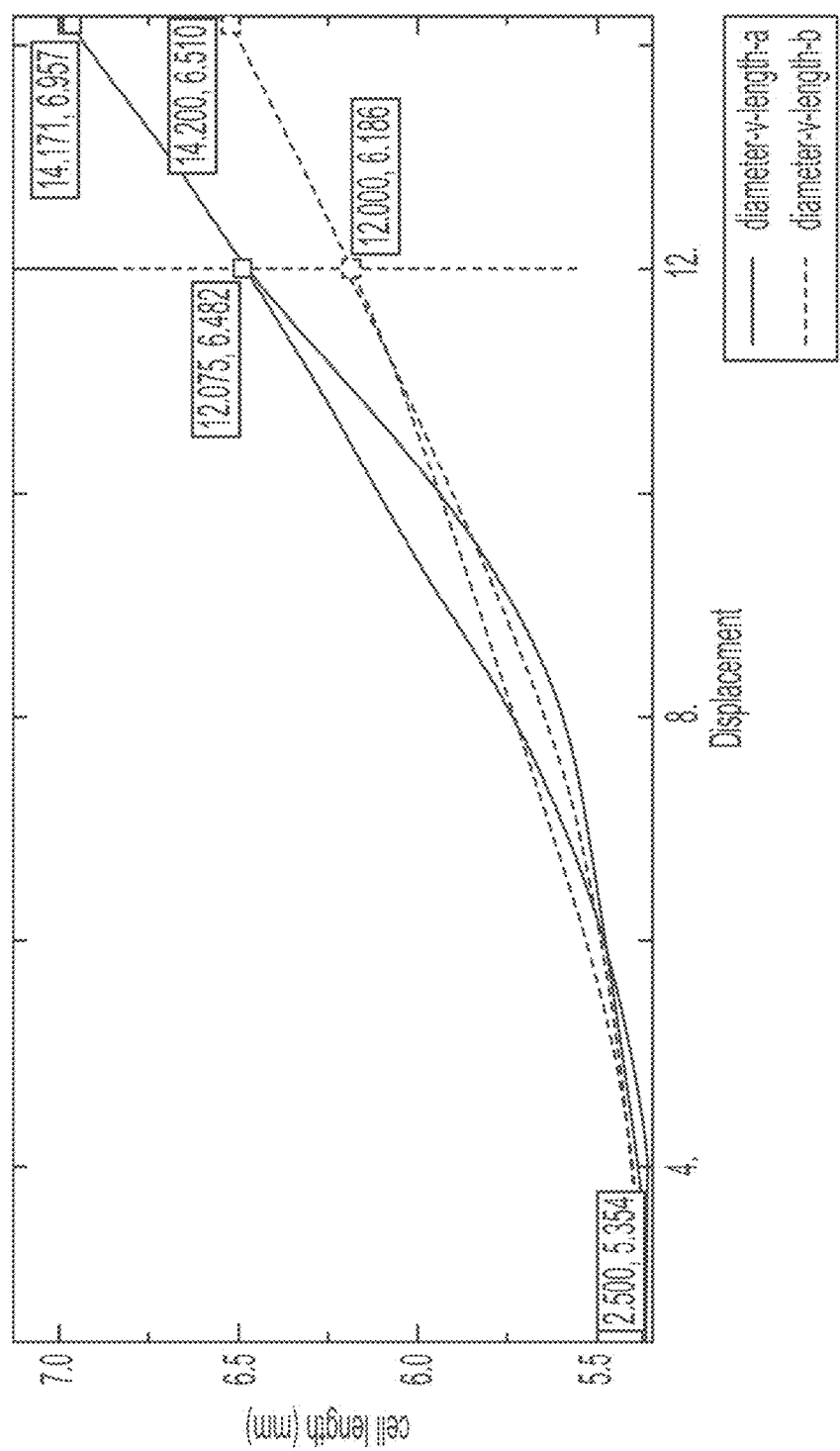
FIG. 30 depicts the cell length as a function of stent diameter for the example stent portions of FIG. 23 as each example stent is manipulated through the configurations depicted in FIGS. 24-28, according to various embodiments.

FIG. 30 shows a comparison of the unit cell length as a function of stent diameter corresponding to the loading regimen in of FIG. 29. For the 10-cell design embodiment, when the model is expanded from 2.5 mm to 12 mm or 14 mm diameter, the unit cell length increases from 5.35 mm to 6.48 mm or 9.96 mm, respectively, corresponding to a 21% and 30% increase in length. For the 12-cell design embodiment, when the model is expanded from 2.5 mm to 12 mm or 14 mm diameter, the unit cell length increases from 5.35 mm to 6.19 mm or 6.51 mm, respectively, corresponding to a 16% and 22% increase in length. This mechanical behavior is in contrast to that which would be observed in conventional stents, which would get shorter as the diameter is increased during deployment (sometimes termed "foreshortening" in the art).

Figure 31:
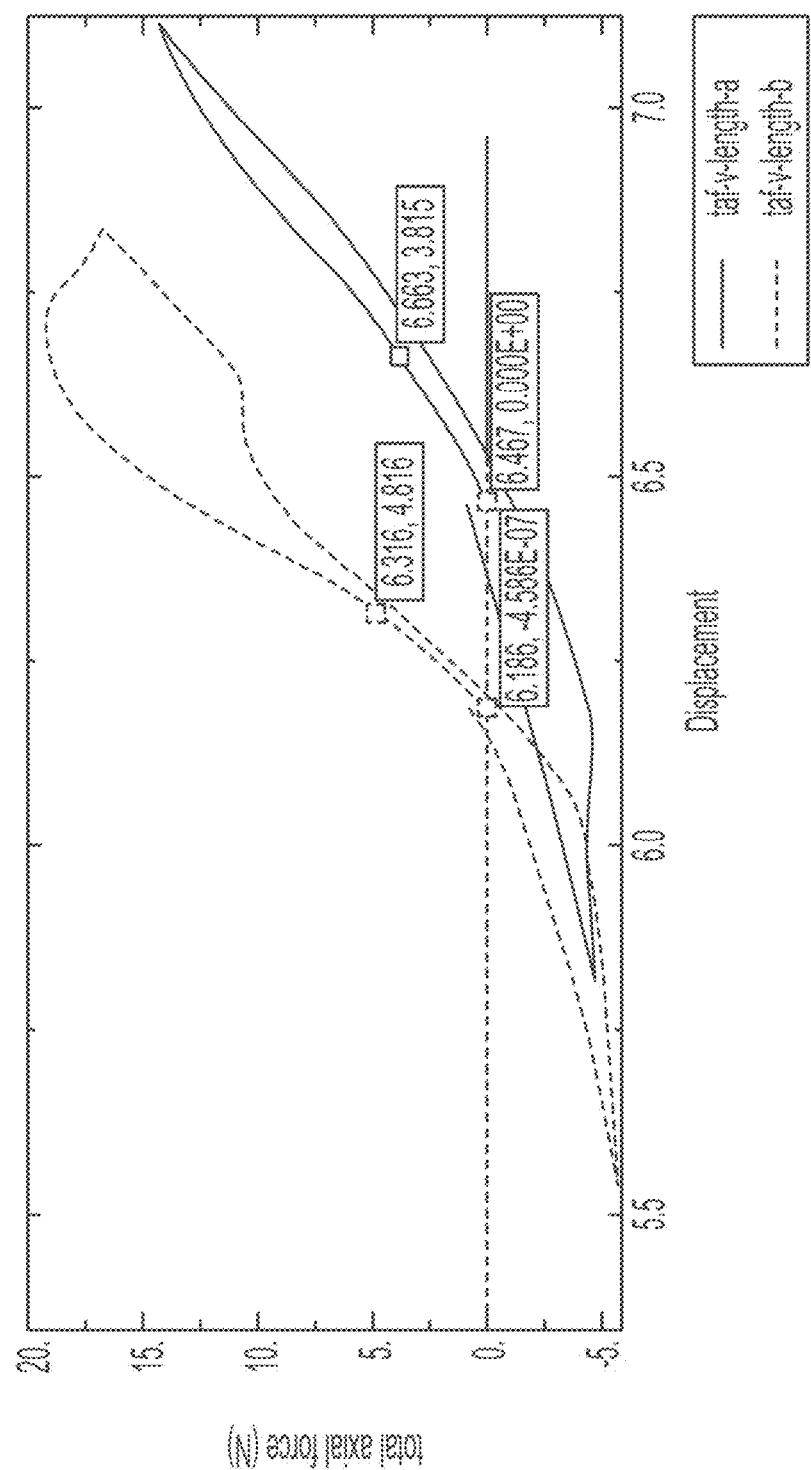
FIG. 31 depicts the total axial force as a function of cell length for the example stent portions of FIG. 23 as each example stent is manipulated through the configurations depicted in FIGS. 24-28, according to various embodiments.

FIG. 31 shows the total axial force versus cell length for the same 10-cell and 12-cell embodiment simulations, which can be used to provide estimates of axial stiffness from the curve slopes. The axial stiffness of the 10-cell design was estimated to be 19 N/mm while the 12-cell design was estimated to be 37 N/mm. The larger axial stiffness of the 12-cell design is reflected in its smaller length change when the stent is deployed.

Figure 32:
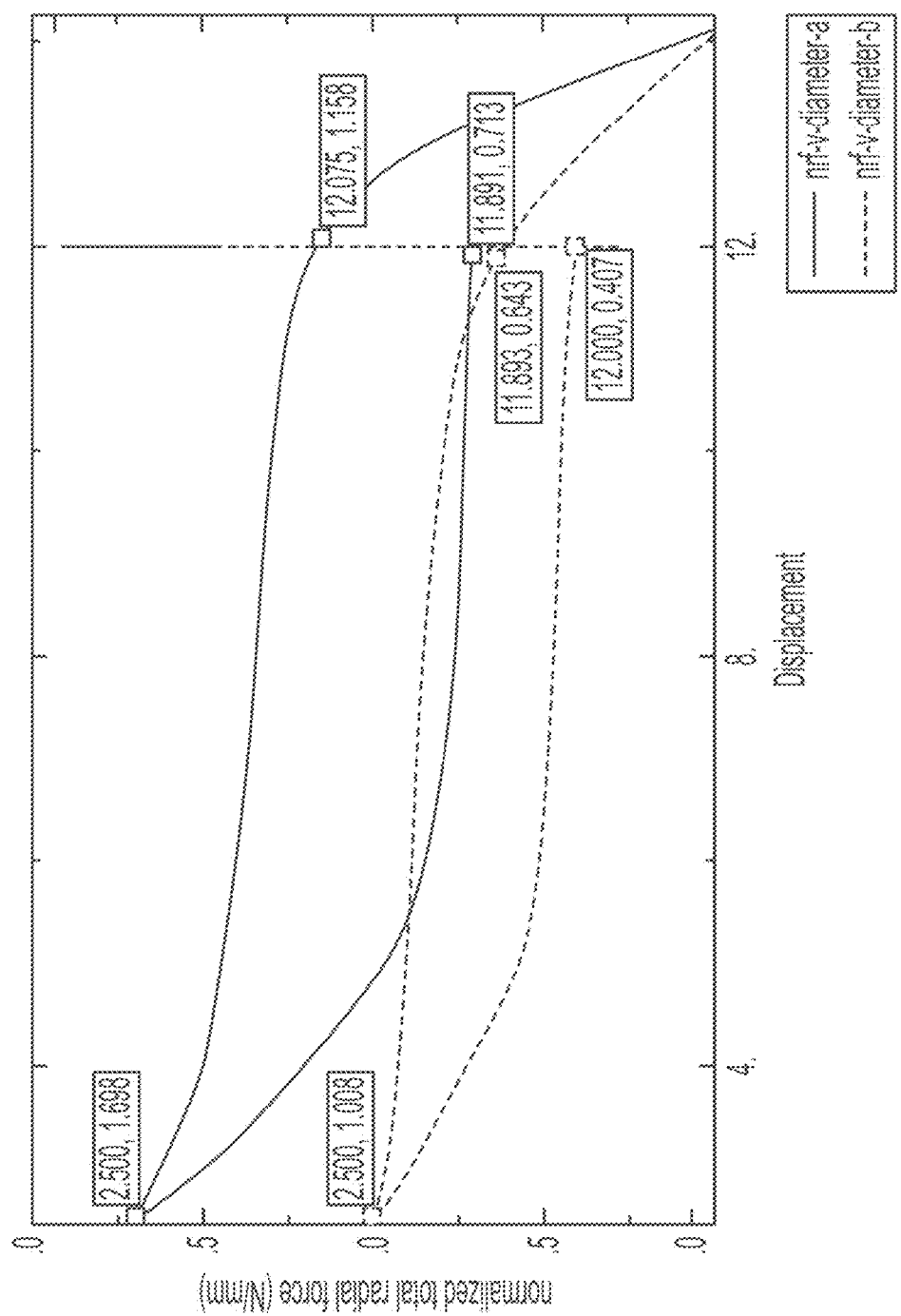
FIG. 32 depicts the total radial force as a function of stent diameter for the example stent portions of FIG. 23 as each example stent is manipulated through the configurations depicted in FIGS. 24-28, according to various embodiments.

FIG. 32 shows the normalized total radial force versus model diameter for the same 10-cell and 12-cell embodiment simulations. These results show that the 10-cell design exerts a greater radial force than the 12-cell design. Compared to typical known peripheral vascular stents, the auxetic designs are predicted to have lower resistive forces and somewhat higher chronic outward forces.

Figure 33:
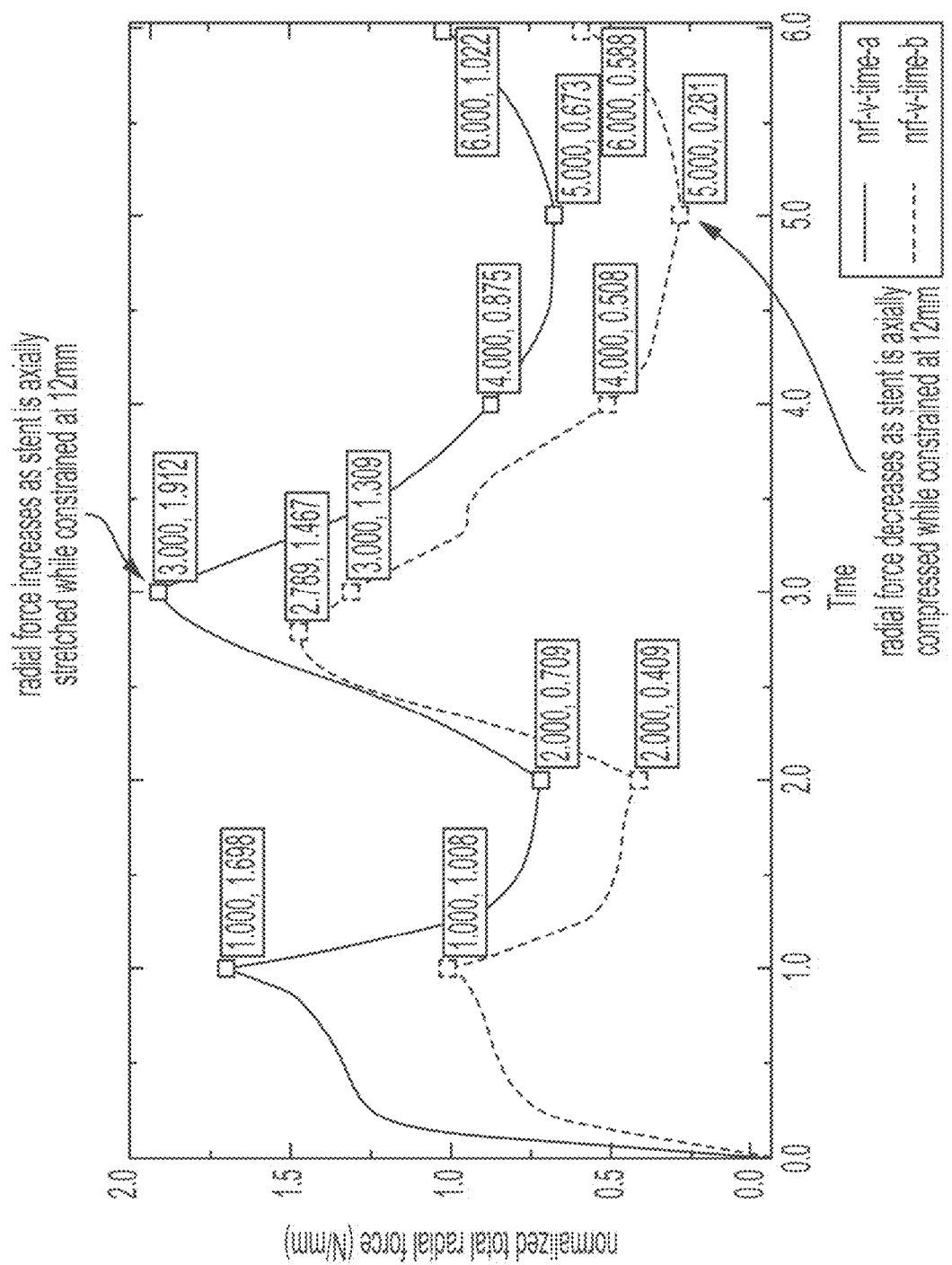
FIG. 33 depicts the normalized total outward radial force over time for the example stent portions of FIG. 23 as each example stent is manipulated through the configurations depicted in FIGS. 24-28, according to various embodiments.

FIG. 33 shows the normalized total outward radial force versus time throughout the same 10-cell and 12-cell embodiment simulations. These results illustrate the relationship between axial and radial stiffness. As may be seen in the depicted embodiments, the outward radial force for the auxetic stent designs increases as the stent is axially stretched, and decreases as the stent is axially compressed. This mechanical behavior may be achieved in various embodiments of the disclosed auxetic stent design, whereas conventional (e.g., non-auxetic) stents typically offer the reverse of this mechanical behavior. In other words, in a typical conventional (non-auxetic) stent the radial outward force would decrease as length is increased by stretching. Note also from these simulation results that the 10-cell design embodiment exhibits a greater outward radial force throughout the applied loading regimen compared to the 12-cell design embodiment.

It will be appreciated that the configurations disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

EXAMPLES

Example 1 includes an apparatus for use in a vein, comprising a first member and a second member, each of the first member and second member comprising a flexible junction, the flexible junction dividing the member into a first segment with a first segment end and a second segment with a second segment end, the first and second segment ends distal from the flexible junction; a cross member with a first end connected to the first segment of the first member and a second end, distal from the first end, connected to the first segment of the second member, wherein the cross member is connected to each first segment closer to each first segment's first segment end than from each member's flexible junction; a first joining member connected to the second segment of the first member closer to the first member's flexible junction than to the second segment end of the first member; and a second joining member connected to the second segment of the second member closer to the second member's flexible junction than to the second segment end of the second member, wherein the cross member, first joining member, and second joining member are each deformable along a longitudinal axis.

Example 2 includes the subject matter of example 1, or some other example herein, wherein the first joining member comprises a third end that is distal from the first member's flexible junction; the second joining member comprises a fourth end that is distal from the second member's flexible junction; each first segment end is configured to flexibly join to a second segment end of a first adjacent apparatus; and the third end is configured to join to a fourth end of a second adjacent apparatus.

Example 3 includes the subject matter of either example 1 or 2, or some other example herein, wherein the apparatus is made from a shape memory material that can be plastically deformed at temperatures below a predetermined temperature, and will return to a non-deformed shape at temperatures above the predetermined temperature.

Example 4 includes the subject matter of example 3, or some other example herein, wherein the apparatus is made from a nickel-titanium alloy.

Example 5 includes the subject matter of any of examples 1-4, or some other example herein, wherein first joining member and second joining member each respectively attach to the first and second members in an acute bend.

Example 6 includes a stent, comprising a plurality of cells, each cell comprising a first member and a second member, each of the first member and second member comprising a flexible junction, the flexible junction dividing the member into a first segment with a first segment end and a second segment with a second segment end, the first and second segment ends distal from the flexible junction; a cross member with a first end connected to the first segment of the first member proximate to the first segment end of the first member, and a second end, distal from the first end, connected to the first segment of the second member proximate to the first segment end of the second member, wherein the cross member is connected to each first segment distal from each member's flexible junction; a first joining member connected to the second segment of the first member proximate to the first member's flexible junction and distal from the second segment end of the first member; and a second joining member connected to the second segment of the second member proximate to the second member's flexible junction and distal from the second segment end of the second member, wherein the plurality of cells are interconnected to each other via one or more of each cell's first segment ends, second segment ends, first joining member, and/or second joining member.

Example 7 includes the subject matter of example 6, or some other example herein, wherein the plurality of cells are interconnected to form a tubular structure.

Example 8 includes the subject matter of example 7, or some other example herein, wherein the plurality of cells comprises a first set of cells, a second set of cells, and a third set of cells; each of the first, second, and third sets of cells comprises a tubular structure, the first set of cells is axially attached to a first end of the second set of cells, and the third set of cells is axially attached to a second end of the second set of cells.

Example 9 includes the subject matter of either example 7 or 8, or some other example herein, wherein the stent has a first end and a second end, and one of the ends comprises a plurality of barbs.

Example 10 includes the subject matter of any of examples 7-9, or some other example herein, wherein the stent comprises a plurality of barbs disposed axially along the stent.

Example 11 includes the subject matter of any of examples 7-10, or some other example herein, wherein each of the plurality of cells is made from a shape memory material that can be plastically deformed at temperatures below a predetermined temperature, and will return to a non-deformed shape at temperatures above the predetermined temperature.

Example 12 includes the subject matter of example 11, or some other example herein, wherein the stent is made from a nickel-titanium alloy.

Example 13 includes the subject matter of any of examples 6-12, or some other example herein, wherein each first joining member and second joining member of each cell is connected to its respective first member and second member in an acute bend.

Example 14 includes a method for controlling a stenosis in a bodily duct, comprising inserting a stent with a tubular configuration into a portion of the duct that is partially or wholly obstructed; and expanding the stent radially to a predetermined diameter that relieves the duct of obstruction, wherein the stent is configured to expand in an axial direction as the stent's diameter is increased, and wherein the stent is comprised of a plurality of cells, each cell comprising a first member and a second member, each of the first member and second member further comprised of a flexible junction, the flexible junction dividing the member into a first segment with a first segment end and a second segment with a second segment end, the first and second segment ends distal from the flexible junction; a cross member with a first end connected to the first segment of the first member proximate to the first segment end of the first member and a second end, distal from the first end, connected to the first segment of the second member proximate to the first segment end of the second member, wherein the cross member is connected to each first segment distal from each member's flexible junction; a first joining member connected to the second segment of the first member proximate to the first member's flexible junction and distal from the second segment end of the first member; and a second joining member connected to the second segment of the second member proximate to the second member's flexible junction and distal from the second segment end of the second member.

Example 15 includes the subject matter of example 14, or some other example herein, wherein the duct is one of, or a portion of one of, a biliary duct, a urogenital tract, a gastrointestinal tract, a tracheobronchial structure, a sinus tract, a salivary gland, a salivary tubule, a lymphatic channel, a surgical enterostomy, a surgical arteriovenous fistula or graft, a surgical anastomosis of at least two bodily structures, or an artery.

Example 16 includes the subject matter of either of example 14 or 15, or some other example herein, further comprising axially expanding or compressing the stent, while maintaining the predetermined diameter, to a predetermined length that prevents occlusion of portions of the vein adjacent to the vein portion that is partially or wholly obstructed.

Example 17 includes the subject matter of any of examples 14-16, or some other example herein, further comprising axially expanding or compressing a first portion of the stent to a different axial length than a second portion of the stent, to place the stent in an axially curved configuration.

Example 18 includes the subject matter of any of examples 14-17, or some other example herein, further comprising radially compressing the stent prior to inserting the stent.

Example 19 includes the subject matter of any of examples 14-18, or some other example herein, wherein the stent is configured to plastically deform when below a predetermined temperature, and return to a non-deformed shape when above the predetermined temperature, and the stent is radially compressed prior to insertion below the predetermined temperature.

Example 20 includes the subject matter of example 19, or some other example herein, wherein the predetermined temperature is below 37 degrees C.

The invention claimed is:

1. An apparatus for use in a vein, comprising:
a first member and a second member, each of the first member and the second member comprising a single flexible junction, each flexible junction dividing each respective member into a first segment with a first segment end and a second segment with a second segment end, the first segment and the second segment of each member extending from its respective flexible junction, and each respective first and second segment ends distal from each respective flexible junction;
a cross member with a first end connected to the first segment of the first member and a second end, distal from the first end, connected to the first segment of the second member, wherein the cross member is connected to each first segment closer to, but spaced from, each first segment's first segment end than from each member's flexible junction;
wherein the first member, the second member, and the cross member define a cell,
a first joining member connected to the second segment of the first member closer to, but spaced from, the first member's flexible junction than to the second segment end of the first member, extending from the first member in a first direction outside the cell; and
a second joining member connected to the second segment of the second member closer to, but spaced from, the second member's flexible junction than to the second segment end of the second member, extending from the second member in a second direction outside the cell and opposing the first direction,
wherein the cross member, the first joining member, and the second joining member are each deformable along a longitudinal axis to permit longitudinal expansion and compression of the apparatus.

2. The apparatus of claim 1, wherein:
the first joining member comprises a third end that is distal from the first member;
the second joining member comprises a fourth end that is distal from the second member;
each first segment end is configured to flexibly join to a second segment end of a first adjacent apparatus; and
the third end is configured to join to a fifth end of a second adjacent apparatus.

3. The apparatus of claim 1, wherein the apparatus is made from a shape memory material that can be plastically deformed at temperatures below a predetermined temperature, and will return to a non-deformed shape at temperatures above the predetermined temperature.

4. The apparatus of claim 3, wherein the apparatus is made from a nickel- titanium alloy.

5. The apparatus of claim 1, wherein the first joining member and the second joining member each respectively attach to the first and second members in an acute bend.

6. The apparatus of claim 1, wherein each flexible junction forms a bend directed toward an interior of the cell.

7. The apparatus of claim 1, wherein the cross-member forms a first acute angle with the first member and a second acute angle with the second member, both the first and second acute angles located in an interior of the cell.

8. A stent, comprising:
a plurality of cells, each cell comprising:
a first member and a second member, each of the first member and the second member comprising a single flexible junction, each flexible junction dividing each respective member into a first segment with a first segment end and a second segment with a second segment end, the first segment and the second segment of each member extending from its respective flexible junction, and each respective first and second segment ends distal from each respective flexible junction;
a cross member with a first end connected to the first segment of the first member proximate to the first segment end of the first member, and a second end, distal from the first end, connected to the first segment of the second member proximate to, but spaced from, the first segment end of the second member, wherein the cross member is connected to each first segment distal from each member's flexible junction;
a first joining member connected to the second segment of the first member proximate to, but spaced from, the first member's flexible junction and distal from the second segment end of the first member, extending from the first member in a first direction outside the cell; and a second joining member connected to the second segment of the second member proximate to, but spaced from, the second member's flexible junction and distal from the second segment end of the second member, extending from the second member in a second direction outside the cell and opposing the first direction, wherein the plurality of cells are interconnected to each other via one or more of each cell's first segment ends, second segment ends, first joining member, and/or second joining member to permit longitudinal expansion and compression of the stent.

9. The stent of claim 8, wherein the plurality of cells are interconnected to form a tubular structure.

10. The stent of claim 9, wherein:

the plurality of cells comprises a first set of cells, a second set of cells, and a third set of cells;

each of the first, second, and third sets of cells comprises a tubular structure, the first set of cells is axially attached to a first end of the second set of cells, and the third set of cells is axially attached to a second end of the second set of cells.

11. The stent of claim 9, wherein the stent has a first end and a second end, and one of the ends comprises a plurality of barbs.

12. The stent of claim 9, wherein the stent comprises a plurality of barbs disposed axially along the stent.

13. The stent of claim 9, wherein each of the plurality of cells is made from a shape memory material that can be plastically deformed at temperatures below a predetermined temperature, and will return to a non-deformed shape at temperatures above the predetermined temperature.

14. The stent of claim 13, wherein the stent is made from a nickel-titanium alloy.

15. The stent of claim 8, wherein each first joining member and second joining member of each cell is connected to its respective first member and second member in an acute bend.

\* \* \* \* \*